United States Patent
Takeuchi et al.

(10) Patent No.: US 6,618,095 B1
(45) Date of Patent: Sep. 9, 2003

(54) SERIAL DIGITAL INTERFACE SYSTEM TRANSMISSION/RECEPTION METHOD AND DEVICE THEREFOR

(75) Inventors: Tomotaka Takeuchi, Osaka (JP); Minoru Nishioka, Hyogo (JP); Noriaki Wada, Hyogo (JP); Tatsushi Bannai, Osaka (JP); Tsugio Murao, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/601,713

(22) PCT Filed: Dec. 6, 1999

(86) PCT No.: PCT/JP99/06811

§ 371 (c)(1),
(2), (4) Date: Sep. 25, 2000

(87) PCT Pub. No.: WO00/35189

PCT Pub. Date: Jun. 15, 2000

(30) Foreign Application Priority Data

| Dec. 7, 1998 | (JP) | 10-346488 |
| Feb. 26, 1999 | (JP) | 11-050039 |
| Aug. 16, 1999 | (JP) | 11-229672 |

(51) Int. Cl.[7] ............ H04N 7/08; H04N 7/084; H04N 7/087
(52) U.S. Cl. ............ 348/476; 348/473; 348/426.1
(58) Field of Search .......... 348/426.1, 432.1, 348/434.1, 441, 446, 469, 473, 476, 477, 488, 489; 375/240.1, 240.11, 240.26; H04N 7/08, 7/084, 7/087

(56) References Cited

U.S. PATENT DOCUMENTS

| 4,479,142 A | * 10/1984 | Buschman et al. | 375/240.01 |
| 4,607,345 A | * 8/1986 | Mehta | 710/61 |
| 5,588,058 A | * 12/1996 | Le Berre | 380/20 |

(List continued on next page.)

FOREIGN PATENT DOCUMENTS

| JP | 4-271395 | 9/1992 |
| JP | 5-323928 | 12/1993 |
| JP | 6-153207 | 5/1994 |

(List continued on next page.)

OTHER PUBLICATIONS

Japanese search report for PCT/JP99/06811 dated Mar. 14, 2000.

(List continued on next page.)

Primary Examiner—Michael H. Lee
Assistant Examiner—Trang U. Tran
(74) Attorney, Agent, or Firm—RatnerPrestia

(57) ABSTRACT

A transmitting method serializes two series of signals into one series of signals, and transmits thereof. The two series of signals are produced through this way: a total number of bits of a luminance signal of an HDTV signal to be transmitted within a frame is divided into units corresponding to a total number of scanning lines 'K' per frame of one channel of an SDTV signal. Then K pcs. of transmission units per frame including a luminance signal and a color signal are produced in two series. Among the transmission units, at least the following data are inserted into the units corresponding to active scanning lines: (a) a given word of the control signal, (b) a signal comprising samples of N timed by a number of words of luminance signal within a given period of one horizontal scanning period of the SDTV, which includes a luminance signal and color signal of the SDTV, and (c) words corresponding to a given level. A transmitter realizing this method is also provided. A receiver and a receiving method automatically detect the source format of the video signal transmitted through the transmitting method using a digital sync signal and a line number. These receiver and method of receiving are also provided.

10 Claims, 26 Drawing Sheets

U.S. PATENT DOCUMENTS

| | | | |
|---|---|---|---|
| 5,734,435 A | | 3/1998 | Wilson et al. |
| 6,323,787 B1 | * | 11/2001 | Yamashita ................... 341/58 |
| 6,493,361 B1 | * | 12/2002 | Yamaguchi et al. ........ 348/476 |
| 6,553,073 B1 | * | 4/2003 | Ogata .................... 375/240.28 |

FOREIGN PATENT DOCUMENTS

| | | |
|---|---|---|
| JP | 8-265662 | 10/1996 |
| JP | 9-214909 | 8/1997 |
| JP | 9-508512 | 8/1997 |
| JP | 9-247667 | 9/1997 |

OTHER PUBLICATIONS

English translation of Form PCT/ISA/210.

Y. Nishida, "Digital Video Interface," 1997, vol. 51, No. 9, pp. 1397–1403 (w/English translation).

T. Eguchi, SMPTE Journal, "Pathological Check Codes for Serial Digital Interface Systems," Aug. 1992, pp. 553–558.

* cited by examiner

SERIAL DIGITAL INTERFACE SYSTEM TRANSMISSION/RECEPTION METHOD AND DEVICE THEREFOR

This application is a U.S. national phase application of PCT international application PCT/JP99/06811 Dec. 6, 1999.

TECHNICAL FIELD

The present invention relates to a method of transmitting and receiving signals by a serial-digital-interface system employed in a broadcasting studio, and a transmitter and a receiver in the same system.

BACKGROUND ART

Various types of serial-digital-interface systems (hereinafter referred to as SDI system) are employed in studios of a broadcasting station. The SDI systems serialize digital video signals in various formats, then transmit the signals between video-editing devices used in the studios, thus the SDI systems must be compatible with respective formats of video signals. The Society of Motion Picture and Television Engineers (SMPTE) and The Association of Radio-wave Industrial Business (ARIB) standardized SMPTE259M standard, SMPTE292M standard, and BTA S-004B standard and so on. Those standards specify formats of serializing digital-video-signals of various formats in parallel form. The "SCOPES OF SMPTE STANDARD" describes that SMPTE259M standard specifies an SDI of 10-bit (4:2:2) component signal operating at 270 Mbps, and SMPTE292M standard specifies an SDI operating at approx. 1.5 Gbps for component signals of High-Definition-Television (HDTV).

Those standards tell that numbers of source formats differing in the following items are used in broadcasting stations: frame frequency, a number of active scanning lines, a number of pixels per frame, scanning method (interlace, progressive methods). For instance, the video signals in such various formats follows are available in the studios:

Standard Definition Television (SDTV) signal:
  scanning-lines; 525
  frame frequency: 30/1.001 Hz
  scanning method: interlace 480/60 I (hereinafter referred to as 480/60 I)
SDTV signal:
  scanning-lines; 525
  active lines: 487
  frame frequency: 60/1.001 Hz
  scanning method: progressive 480/60 P (480/60 P)
HDTV signal:
  scanning-lines; 1125
  active lines: 1080
  frame frequency: (30/M) Hz
  scanning method: interlace 1080/60 I
HDTV signal:
  scanning-lines; 1125
  active lines: 1035
  frame frequency: (30/M) Hz
  scanning method: interlace 1035/60 I
HDTV signal:
  scanning-lines; 750
  active lines: 720
  frame frequency: (60/M) Hz
  scanning method: progressive 720/60 P
where M represents 1 or 1.001.

When one of the STDV video signals, i.e. a signal of 480/60 I method, is serialized and transmitted in accordance with the SMPTE259M standard which is one of SDIs for the SDTV, the signal undergoes the following processes. FIG. 2 illustrates a sampling structure per frame of the video signal by 480/60 I system. The format of this video signal is as follows: frame frequency=30/1.001 Hz, a number of scanning lines=525, a number of samples (words) per scanning line =858, a number of active samples (words)=720, a sampling frequency=13.5 MHz. This luminance signal and two color-difference signals are sampled at one half the frequency of luminance signal, and then multiplexed to form a multiplexed color signal. This multiplexed color signal, is multiplexed to the luminance signal in each word, then transmitted at 270 Mbps.

On the other hand, when one of HDTV signals, i.e. a video signal of 1080/60 I method, is serialized and then transmitted in accordance with the SMPTE292M standard, or BTA S-004 standard which is one of SDIs for the HDTV, the signal undergoes the following processes. The format of this video signal is as follows: frame frequency=30/1.001 Hz, a number of scanning lines=1125 (1080 active), a number of samples (words) per scanning line=2200, a number of active samples (words)=1920, a sampling frequency= 74.25/1.001 MHz. The luminance signal and color-difference signals are structured in the same way as discussed above. The luminance signal and color difference signals are multiplexed to each word, then transmitted at 1.485/1.001 Gbps.

FIG. 25 illustrates a structure of a conventional SDI system compatible both with the HDTV and SDTV. This SDI system comprises transmitter 309 and receiver 315. In transmitter 309, parallel-video-data (video signal (1) in FIG. 25) in HDTV, 1080/60 I format and another parallel-video-data (video signal (2) in FIG. 25) in SDTV, '480/60 I' format comprises luminance signals (hereinafter referred to as Y-signal) in 10-bit, and multiplexed color-difference signals (hereinafter referred to as C-signal). This parallel-video-data are fed into HD interface formatting circuit 306 and SD interface formatting circuit 326 respectively in 20-bit parallel form. In these formatting circuits 306 and 326, an end of active video (EAV) signal as well as a start of active video (SAV) signal is multiplexed to respective Y and C signals. The EAV signal is a timing-reference signal indicating an end of horizontal and vertical active periods, while the SAV signal is a timing-reference signal indicating a start thereof. Line number data and an error-detecting-code are also multiplexed to Y and C signals in formatting circuit 306, and they are supplied as an interface format. Output from interface formatting circuits 306 and 326 are fed into parallel to serial converting circuits (hereinafter referred to as a P/S converting circuit) 307 and 327, where the least significant bit (LSB) of C-signal and onward including C-signal and Y-signal in this order undergo the P/S conversion and then they are output to scrambling circuits 308 and 328. Circuits 308 and 328 scramble the input signals with generating function $(X^9+X^4+1)$ $(X+1)$, and output them. The signals scrambled in circuit 308 are converted into voltages in accordance with the SMPTE292M standard by a voltage-converting-circuit (not shown), and are output as a serial signal. A transmitting speed of the HDTV signal output here is approx. 1.5 Gbps. The signal scrambled in circuit 328 is converted into a voltage in accordance with the SMPTE259M standard, and output as a serial signal. A transmitting speed of the SDTV signal output here is approx. 270 Mbps.

Those signals are fed into receiver 315, where waveform-equalizing circuits 310 and 330 receive the serial signals of HDTV and SDTV from transmitter 309. Circuits 310 and 330 compensate degraded signals due to a coaxial cable used in the transmission line, and equalize the waveforms thereof then output the signals. Clock reproducing circuits 311 and 331 receive the output from waveform-equalizing-circuits 310 and 330, extract clock component thereby reproducing a clock signal, then output serial data and serial clock signal. De-scrambling circuits 312 and 332 receive the serial data as well as the serial clock signal from circuits 311 and 331, and then descramble and output them. Serial to parallel converting circuits (S/P converting circuit) 313 and 333 receive the serial data descrambled, and convert the data into parallel form, then output the parallel data. HD interface deformatting circuit 314 and SD interface deformatting circuit 334 receive the parallel data from circuits 313 and 333, and convert them into video-parallel-data in the same format as the signals have been fed into transmitter 309, then output the data. As discussed above, respective SDI systems for SDTV and HDTV are prepared independently, and thus each type of signals employs respective appropriate systems.

If various video formats, e.g. HDTV and SDTV, can be transmitted through an identical SDI system and an identical transmission line, and further if the SDI system can transmit a plurality of channels, it will produce great advantages in this industry. The advantages include, (a) reducing a number of transmission lines, (b) simplifying the work of preparing the transmission lines, (c) downsizing the circuit of SDI system, and (d) reducing the cost of SDI system. However, when the various formats discussed above are serialized, transmission speed thereof may be 270 Mbps for SDTV, 480/60 I format, and 540 Mbps for SDTV, 480/60 P format (for instance, 270 Mbps through two lines). On the other hand, serialized HDTV format produce the transmission speed of 1.485/1.001 Gbps, or 1.485 Gbps. Since these two speeds has only a small difference, a transmitter and a receiver compatible with these two speed can be realized with ease. However, the difference in transmission speed between SDTV format and the HDTV format, i.e. 270 Mbps, 540 Mbps and 1.485 Gbps, 1.485 /1.001 Gbps is great, and also both the formats uses different multiplex-methods of digital sync signal at serializing. As a result, it has been difficult to realize a common transceiver compatible with both of the format. In the SDI system, the transmitter sometimes produces a sequence of specific identical codes at outputting serial data depending on a level of parallel video data fed into the transmitter. The receiver in the system needs a waveform equalizing circuit for compensating a signal degraded through a coaxial cable used in the transmission line and a clock-signal-reproducing-circuit for reproducing a serial clock signal from the serial data.

When the identical code is sequentially fed into the receiver, the waveform equalizing circuit has a difficulty to identify the post-equalizing. digital values, i.e. "0" and "1", because low frequency component is cut off in the equalizing circuit. This situation may produce errors. Further, in the clock-signal-reproducing-circuit, the clock-signal component to be extracted becomes less. This situation thus may produce errors. The problem of the identical code occurring sequentially is discussed in "Pathological Check Codes for Serial Digital Interface Systems" published from SMPTE Journal, August 1992, page 553–558. Patterns of a sequence of specific and identical code are shown in FIG. 24. FIG. 24(A) shows a pattern where a sequence of 20-bit stands at "1" and the next sequence of 20-bit stands at "0". FIG. 24(B) shows a pattern where the first one bit stands at "1" followed by 19-bit standing at "0". Another pattern where the order is reversed is available, i.e. the first bit stands at "0" followed by 19-bit standing at "1". These patterns are called pathological pattern, which may be produced when the same scrambling circuit that in the SDI system is used. When parallel-video-data fed into the receiver produces specific two values in sequence, these patterns may occur in the output from the transmitter. These specific values are described in the document introduced above.

Parallel-video-data is multiplexed with timing-reference-signals of EAV and SAV. These reference signals include the words of 3FFh, 000h, 000h indicating the end and the start of active video period. These values are not included in the specific values discussed above. Therefore, when the EAV or SAV is fed into the parallel-video-data, the sequential production of identical codes stops even if one of the patterns shown in FIG. 24 occurs in sequence.

As a result, the maximum length of the sequence of that specific value is an active video period from the SAV to EAV. An active video period per line of an HDTV signal is 1920 words for Y and C signals respectively. The SDI system accommodating the HDTV format now commercialized is equipped with a receiving circuit which works properly within the active video period, i.e. up to 1920 words.

It can be considered that a plurality of channels of SDTV signals which has less data are multiplexed for transmitting the signals at a transmission speed of the serial data in the HDTV format. However, when the plurality of channels of SDTV signals are multiplexed, the number of multiplexed words to be transmitted may exceed 1920 words, i.e. an active video period of the HDTV format. As such, when the SDTV signal is transmitted through the SDI of the HDTV format, and received by the same waveform equalizing circuit as well as clock reproducing circuit as those in the SDI at receiver side of the HDTV format, the maximum length (i.e. the active video period) of producing an identical code in series is longer than that in the HDTV case. This situation thus may produce errors. Therefore, when the multiplex of plural SDTV signal causes the active video period to exceed 1920 words, it is not proper for the signals to be transmitted through the hardware of the SDI for the HDTV format.

DISCLOSURE OF THE INVENTION

The present invention aims to transmit a video signal in the SDTV format through an interface for a serial digital signal in the HDTV format. A transmission method of the present invention allows video signals in the SDTV format of at least one channel to be transmitted as HDTV signals through one channel, or allows video signals in the SDTV format of N channels (N is integer not less than one.) to be transmitted in a serial-digital form. A total number of bits of luminance signal (Y-signal) to be transmitted within one frame of an HDTV signal is divided into units corresponding to a total number (K) of scanning lines per frame of SDTV signal of one channel for producing K units to be transmitted. Among these K units, two series of signals comprising K units per frame are formed in the units corresponding to active scanning lines. This signal in the two series includes at least the following elements:

(a) predetermined control signal word;
(b) a signal comprising samples containing "N×a number of words of Y-signal" in a predetermined period within one horizontal scanning period of the SDTV; and
(c) a word corresponding to a predetermined level.

These two series of signals are serialized, then transmitted in a single series.

The present invention further aims to provide a transmitter which carries out the transmission method discussed above.

Still further, the present invention aims to provide a receiving method and a receiver which automatically detect a format transmitted through the interface discussed above using a digital sync, signal and a line number.

DETAILED DESCRIPTION OF PREFERRED EMBODIMENTS

Exemplary embodiments of the present invention are demonstrated hereinafter with reference to the accompanying drawings.

Exemplary Embodiment 1

Figure 1:
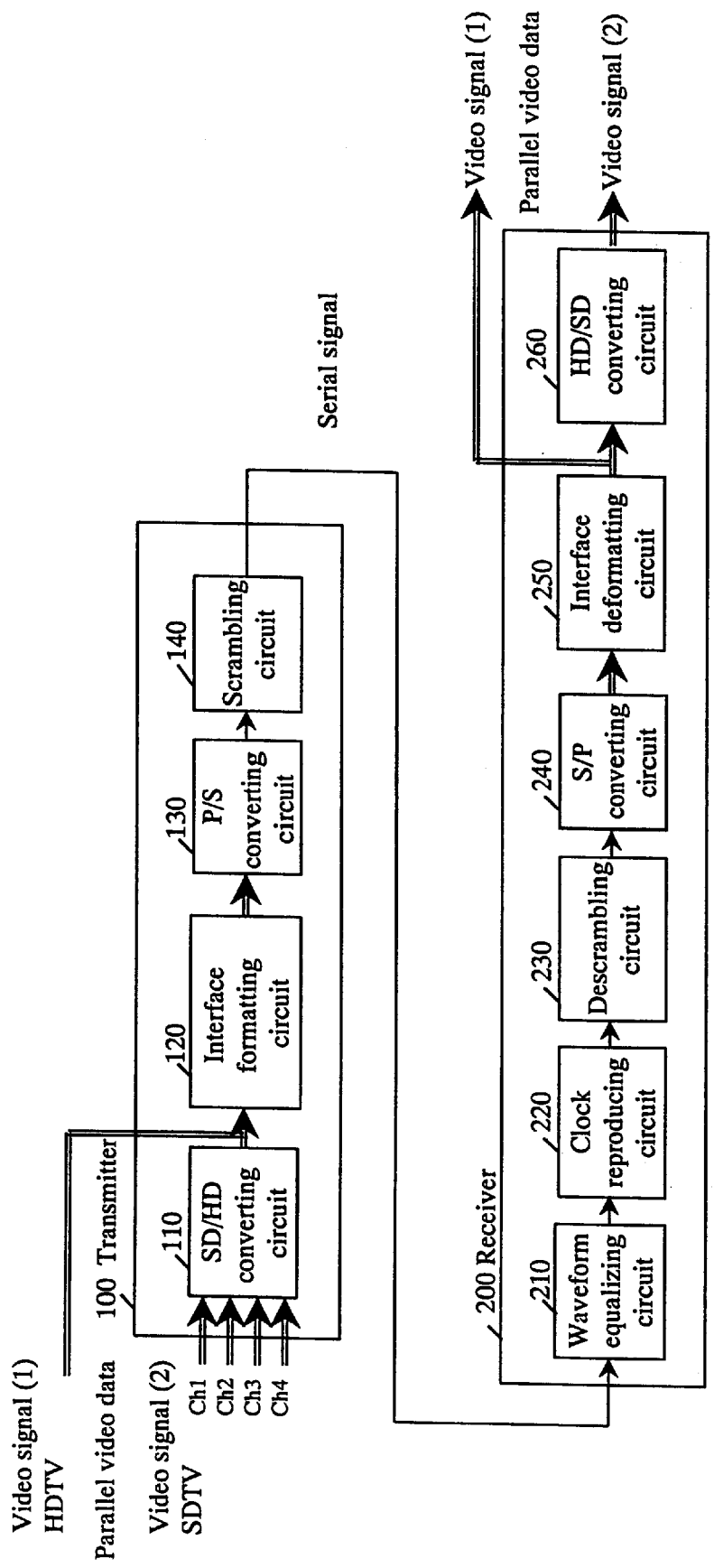
FIG. 1 is a block diagram illustrating a structure of a transmitter and receiver of an SDI system in accordance with a first exemplary embodiment of the present invention.

The first embodiment refers to a transmitter and a receiver as well as a method of transmission and reception which converts a transmission speed of a video signal of one channel in SDTV format into that of HDTV format, then outputs the signal. FIG. 1 is a block diagram illustrating a structure of a transmitter and receiver of an SDI system in accordance with the first exemplary embodiment of the present invention.

In FIG. 1, the SDI system of the present invention comprises transmitter 100 and receiver 200. First, a case where video signal (1) in HDTV format is transmitted is demonstrated. In transmitter 100, parallel-video-data in HDTV format comprises a luminance signal (Y-signal) in 10-bit and a multiplexed color-difference signal (C-signal) in 10-bit. This data is fed into interface formatting circuit 120, where the Y and C signals are multiplexed with an end of active video (EAV) signal as well as a start of active video (SAV) signal. The EAV signal is a timing-reference signal indicating an end of horizontal and vertical active periods, while the SAV signal is a timing-reference signal indicating a start thereof. Line number data and an error-detecting-code are also multiplexed to the Y and C signals, and they are output. An output of "10-bit×2 channels" from interface formatting circuit 120 is fed into parallel to serial converting circuit (P/S converting circuit) 130, where the least significant bit (LSB) of C-signal and onward including C-signal and Y-signal in this order and alternately by word undergo the P/S conversion and then they are output to scrambling circuits 140. Circuit 140 scrambles the input signals, and outputs them. The signal scrambled in circuit 140 is converted into a voltage in accordance with the SMPTE292M standard, and output as a serial signal of 1.485/1.001 Gbps.

In receiver 200, waveform-equalizing-circuit 210 receives the serial signals of HDTV. Circuit 210 compensate degraded signals due to a coaxial cable used in the transmission line, and equalizes the waveforms thereof then output the signals. Clock reproducing circuit 220 receives the output from waveform-equalizing-circuit 210, extracts clock component thereby reproducing a clock signal, then outputs serial data and serial clock signal. De-scrambling circuit 230 receives the serial data as well as the serial clock signal from circuit 220, and then descrambles and outputs those signals. Serial to parallel converting circuit (S/P converting circuit) 240 receives the serial data descrambled, and convert the data into parallel form, then output the parallel data. Interface deformatting circuit 250 receives the parallel data from circuit 240, and convert the data into video-parallel-data (1) in the same format as the signals have been fed into transmitter 100, then output the data. The operation discussed above is to transmit the HDTV signal through SDI for the HDTV format, thus this operation is the same as the conventional one.

Figure 2:
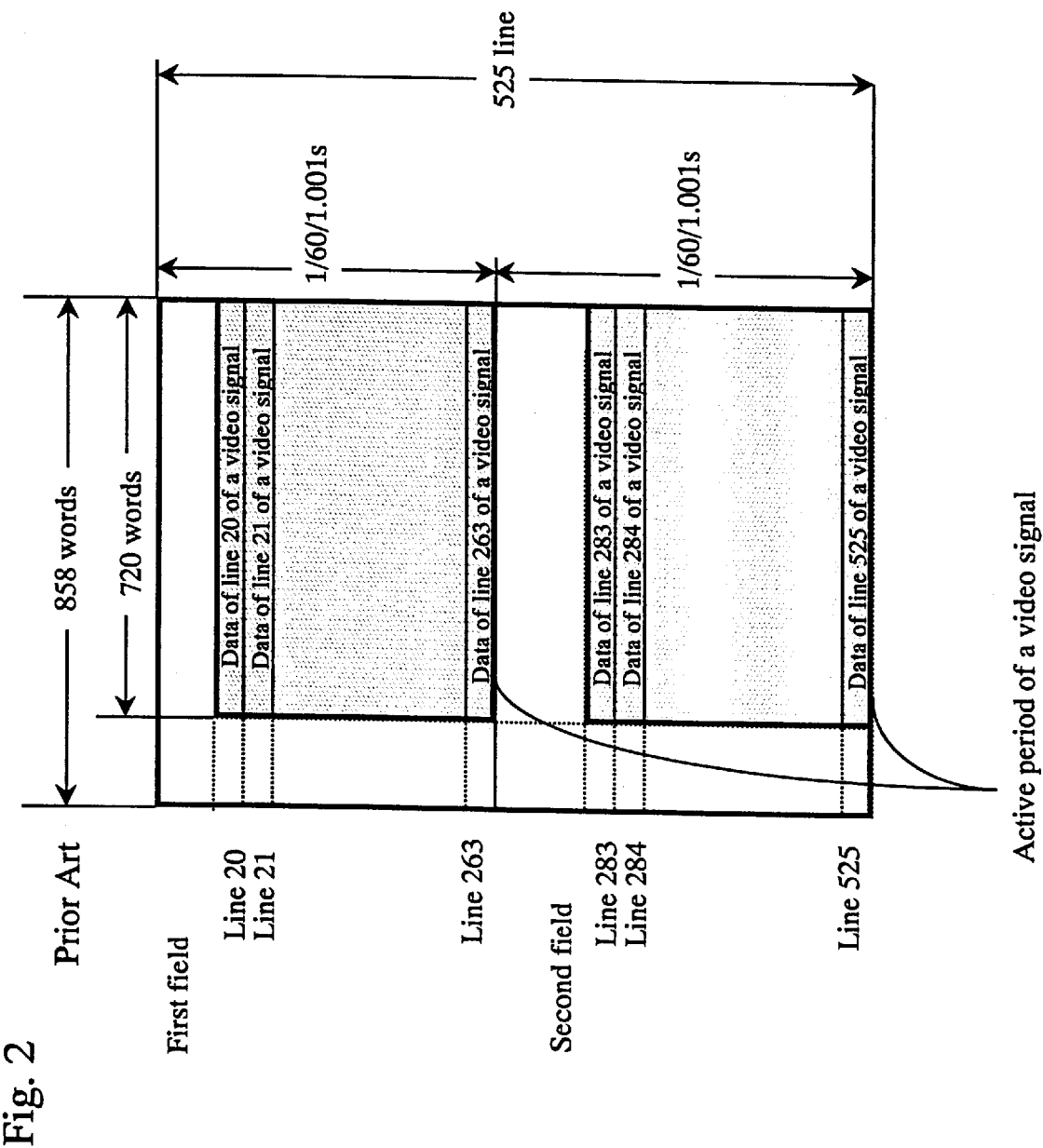
FIG. 2 illustrates a concept of a video signal format by 480/60 I method.
Figure 3:
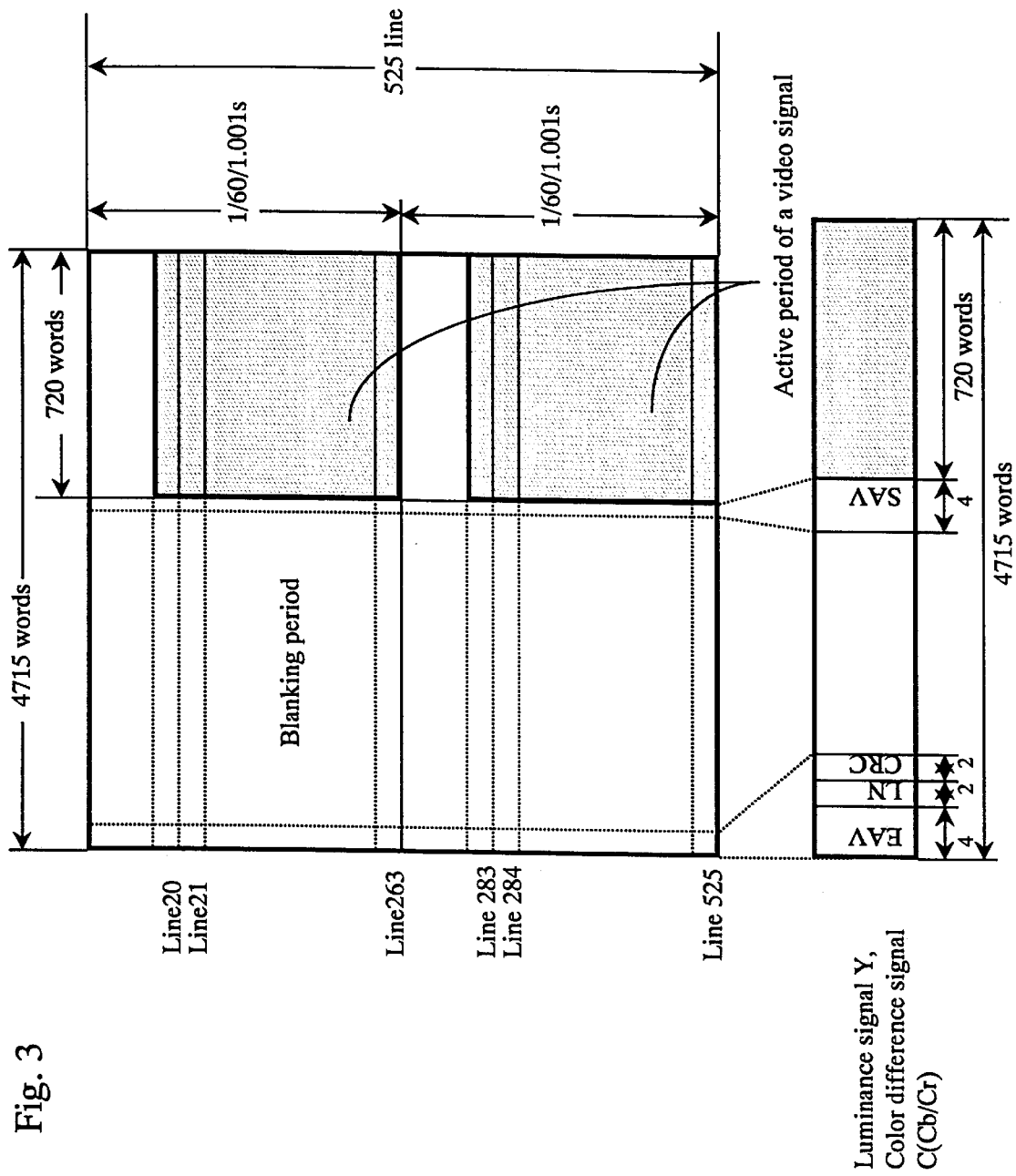
FIG. 3 illustrates a concept of a transmission format of a converted video signal in 480/60 I form by the transmitter in accordance with the first embodiment of the present invention.

Next, a case where a video signal (2) in SDTV format is transmitted is demonstrated with reference to FIGS. 1–3. First, a video signal of one channel in STDV format is transmitted. FIG. 2 is a schematic drawing illustrating a video signal format by 480/60 I method. This format is converted into a transmission format shown in FIG. 3. This conversion process is described hereinafter. A total number of pixels per frame by 1080/60 I method is 1125×2200. On the other hand, a total number of pixels per frame by 480/60 I method is 525×858 as shown in FIG. 2. In this condition, try to increase a number of samples (i.e. words) in a horizontal blanking period, thereby increasing a number of samples (words) per scanning line by maintaining a number of scanning line at 525 as well as a number of active pixels per scanning line at 720. In other words, the number of samples of the video signal by 480/60 I method increases to (1125×2200)/525 by maintaining the number of scanning line at 525. In this case, a number of samples per scanning line of the interface format is increased to the number mentioned above, while one scanning line of the source format includes 858 samples. This increased samples can be transmitted at the speed of 1.485/1.001 Gbps. However, since the number of words/scanning line is (1125×2200)/525, i.e. 4714.26, which is not an integer, one line including 4715 words and another line including 4714 words would be mixed. If signals such as having different numbers of words are transmitted, a receiver is hard to detect a sync. To be more specific, when a signal is transmitted in serial, a receiver detects EAV or SAV which is a digital sync signal to establish a synchronization. When EAV or SAV is fed at a predetermined timing—when a total number of words or active pixels per scanning line takes an identical number—a receiver can establishes the synchronization in a stable manner even if the receiver cannot detect the EAV or SAV due to transmission errors. This is because of the periodic input of the EAV or SAV. However, if signals in different formats in respective lines are fed into the receiver at the production of the EAV or SAV, and the receiver cannot detect it due to errors in the EAV or SAV, the receiver would have a difficulty to establish the synchronization because the timing of producing the EAV or SAV is unclear for the receiver. Therefore, a number of words must be identical throughout one video format.

For the reason discussed above, the number of words is round up or down to be 4715 or 4714 so that the number is fixed. In this case, a total number of samples per frame, i.e. a speed in serial transmission, is different from that of 1080/60 I method in HDTV format, thus a frequency per word is changed, and the transmission is carried out at the standing frame frequency of 60/1.001 Hz. In other words, when the number of words per scanning line is 4714, a serial transmission speed is $\{(4714\times525)/(2200\times1125)\}\times1.485/1.001=1.4834$ Gbps. In the same manner, when the number of words per scanning line is 4715, a serial transmission speed is $\{(4715\times525)/(2200\times1125)\}\times1.485/1.001=1.4837$ Gbps. Accordingly, a frequency of one word is 74.171 MHz when the number of words per scanning line is 4714, and the frequency of one word is 74.187 MHz when the number of words per scanning line is 4715. Two serial transmission speeds are available in HDTV format, i.e. 1.485/1.001 Gbps=1.4835 Gbps and 1.485 Gbps. The difference between these two values is small enough to obtain a transmitter and receiver compatible with these two speeds. In this case, a phase-locked loop (PLL) circuit can be used. This hardware accommodates the transmission speed ranging from 1.485/1.001 Gbps to 1.485. Gbps, thus when the signal by 480/60 I method is converted to a transmission signal having a speed close to that for the HDTV signal, the speed is preferably between 1.485/1.001 Gbps and 1.485 Gbps. If the matching with HDTV devices accommodating these two speeds is considered, the conversion close to the serial transmission speed of the HDTV method is preferably carried out to 1.4834 Gbps at 4715 words per scanning line as shown in FIG. 3. If a conversion closer to 1.485/1.001 Gbps is required, the number of words per scanning line may be 4714.

Figure 4:
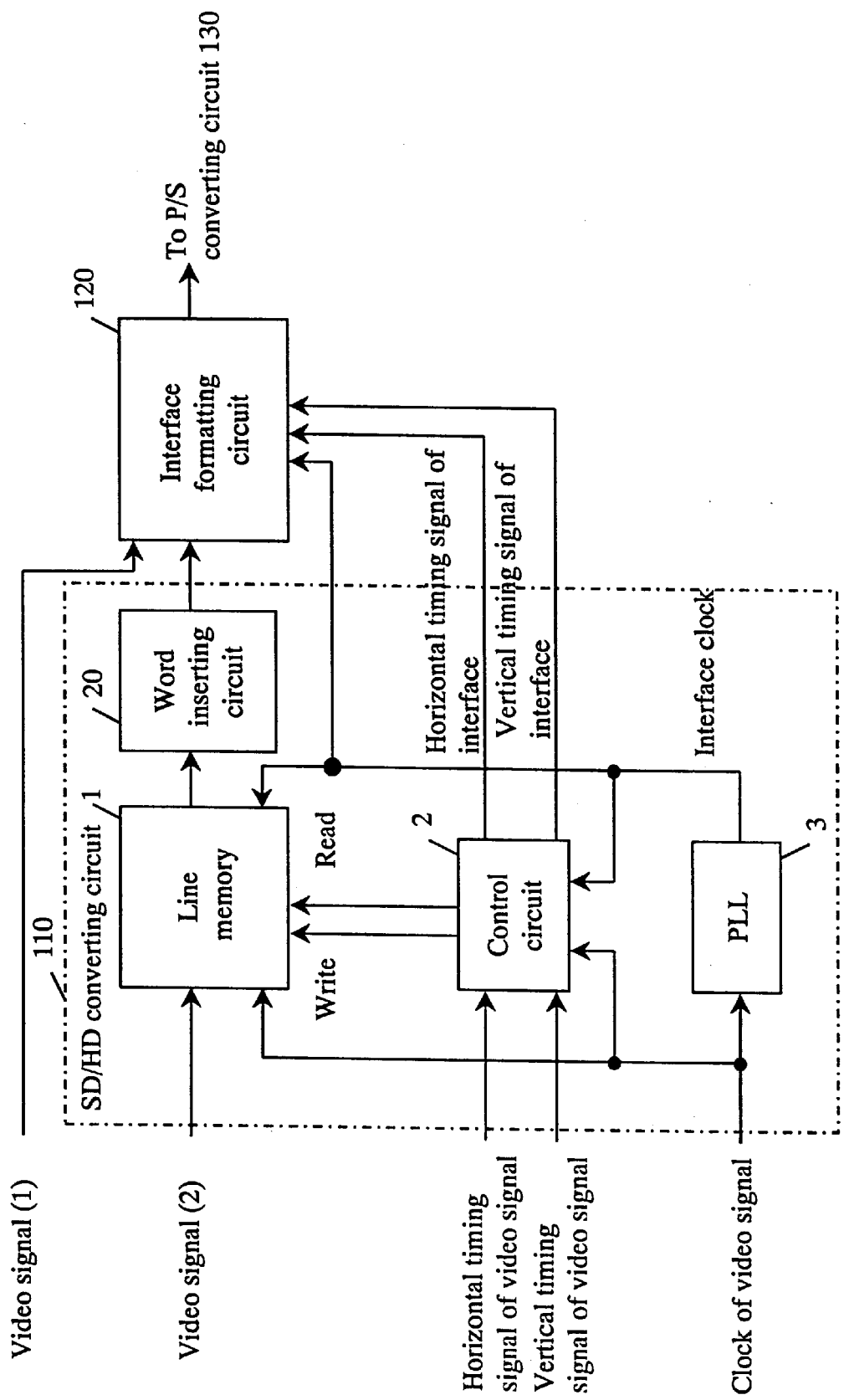
FIG. 4 shows an essential part of an SD/HD converting circuit in the transmitter in accordance with the first embodiment of the present invention.
Figure 5:
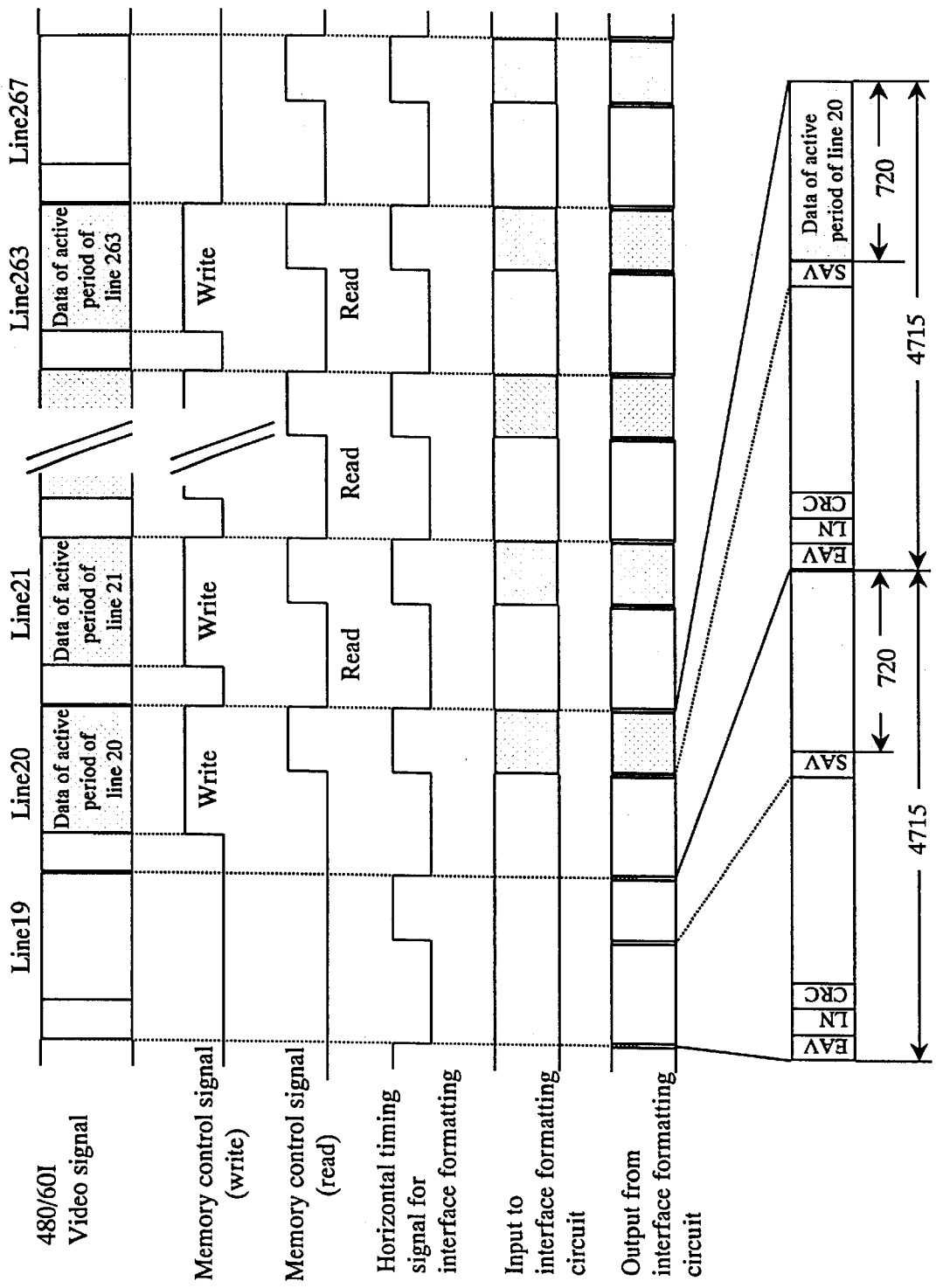
FIG. 5 shows a timing chart illustrating an operation of the transmitter in accordance with the first embodiment of the present invention.

Back to the first embodiment shown in FIG. 1, an operation thereof is demonstrated with reference to FIGS. 4 and 5. The parallel video data of SDTV format comprising Y-signal and multiplexed C-signal—each of them is in 10-bit parallel digital form—is fed into SD/HD converting circuit 110, where the SDTV video signal is converted into a transmission signal in the HDTV format shown in FIG. 3. In the following demonstration, 4715 words per scanning line is used. FIG. 4 is a block diagram illustrating an essential part of SD/HD converting circuit 110 of transmitter 100 in accordance with the first embodiment of the present invention. FIG. 5 is a timing chart illustrating an operation of the transmitter in accordance with the first embodiment. Circuit 110 in FIG. 4 comprises the following elements:

(a) line memory 1 for taking in a video signal of an active period of a 480/60 I format;

(b) control circuit 2 for receiving (b-1) a clock of the video signal in the 480/60 I format, (b-2) horizontal and vertical timing signals of the video signal in the 480/60 I format, controlling line memory 1 to take in the active period of the video signal in the 480/60 I format, and outputting horizontal and vertical timing signals of an interface;

(c) PLL circuit 3 for generating a clock of the interface from the clock of the video signal in the 480/60 I format; and (d) word-inserting-circuit 20 for receiving an output from line memory 1, inserting a word corresponding to a pedestal level into a period other than the active period of the video signal, so that the period becomes a horizontal and vertical blanking periods.

Interface-formatting-circuit 120 adds a digital sync signal in the HDTV format to an output from word-inserting-circuit 20. An operation of formatting circuit 120 is demonstrated hereinafter. First, line memory 1 takes in the active period of video signal in the 480/60 I format. Then, PLL circuit 3 generates the interface clock of 74.187 MHz={(4715×525)/(2200×1125)}×74.15/1.001. The line frequency of this video signal in the 480/60 I format is the same as that of the interface, so that this clock is generated with ease. The active period of the video signal taken into line memory 1 is supplied therefrom by a read-out signal generated in control circuit 2 together with the interface clock. When the active period is supplied from line memory 1, the final word of the active period is supplied approx. at the same timing as an end section (an end section of read-out period on one line) of the read-out signal from line memory 1 in order to minimize a delay at the transmitter. For instance, when the final word of the active period is supplied not at approx. the same timing as the end section of the read-out signal but the first word and the head of read-out are supplied approx. at the same timing, a delay at the conversion from the view of video signal in 480/60 I format becomes as long as one line. When line memory 1 outputs according to the timing shown in FIG. 5, the output can be supplied approx. at the same line as that of the video signal in 480/60 I format. As a result, the delay at the conversion on the transmitter side can be minimized. Word-inserting-circuit 20 receives an output from line memory 1, and inserts a word corresponding to a pedestal level into a horizontal and vertical blanking periods (the period other than the active period of the video signal). Next, the video signal supplied from circuit 20 is fed into interface formatting circuit 120, where the video signal is multiplexed with a digital sync signal for serial transmission such as EAV, line number, cyclic redundancy check (CRC), SAV and the like following the horizontal and vertical timing signals of the interface supplied from control circuit 2. Then the multiplexed signal is output. This output from circuit 120 differs in numbers of scanning lines, words in the active period per line, total words per line; however, the format of digital sync signal such as EAV, SAV, line number, and CRC, is as same as that of SMPTE292M standard and BTA S-004 standard.

When auxiliary data is multiplexed as the HDTV system does, the data is multiplexed in the horizontal and vertical blanking periods. After this, an output forming "10-bit parallel×2 channels" supplied from formatting circuit 120 undergoes the same process as the HDTV system does, then the output is supplied in serial.

The structure discussed above allows the video signal in 480/60 I format to be converted to a transmission signal having a speed close to that for the HDTV signal, so that a transmitter of the HDTV signal can output the converted video signal with a minimized delay without substantial modification in circuitry.

In the demonstration discussed above, only the active period is taken into line memory 1; however, blanking period and the like can be included. A serial transmission is described in this embodiment; however, a parallel transmission can effects the same advantage. Not only 4715 words per line, but also 4714 words per line can be applied to this embodiment. The 480/60 I format has been taken as an example in this embodiment; however, other formats are applicable to this embodiment.

The video signal in 480/60 I format has 525 scanning lines, a frame frequency of 60/1.001 Hz. The video signal in 720/60 P format has 750 scanning lines, a frame frequency of 60/1.001 Hz and 1650 words per scanning line. When the number of words per scanning line is calculated as same as the 480/60 I format, 750×1650/525=2357.14. Round up and round down of this number make the numbers of words 2358 and 2357 respectively. In the case of 2357 words per scanning line, the transmission speed is {(2357×525)/(750× 1650)}×1.485/1.001=1.4834 Gbps. In the case of 2358 words, the transmission speed is {(2358×525)/(750×1650) }×1.485/1.001=1.4841 Gbps.

Exemplary Embodiment 2

The second embodiment refers to a transmitter and a transmitting method which convert video signals of a plurality of channels in the SDTV format into transmission signals having a transmission speed of the HDTV format. First, video signals of two-channels in 480/60 I and SDTV format shown in FIG. 2 are converted into transmission signals having the speed of the HDTV format, then the converted signals are output of one channel. This operation is detailed hereinafter with reference to FIGS. 2, 6 and 7. The elements used in the first embodiment bear the same reference marks, and the description thereof are thus omitted here.

First, a method of transmitting is demonstrated. When a video signal in the HDTV format needs to be transmitted in serial, a digital sync signal is added to respective Y-signal and C-signal of 10-bit each before the video signal is transmitted. In the first embodiment, a video signal of one channel in 480/60 I format is transmitted by adding a digital sync signal to respective Y-signal and C-signal of 10-bit each. In a case of multiplexing and transmitting a video signal of two channels in 480/60 I format, Y-signal and C-signal of 10-bit each of one channel are multiplexed each other to form a video data of 10-bit. Then a digital sync signal is multiplexed to the video data before the data is transmitted. In other words, when video signals of two channels in 480/60 I format need to be multiplexed and transmitted, 4715 words per scanning line and a serial transmission speed of 1.4837 Gbps are kept the same as those in the first embodiment. However, a number of active data per scanning line doubles to 1440 because Y-signal is multiplexed with C-signal.

Figure 6:
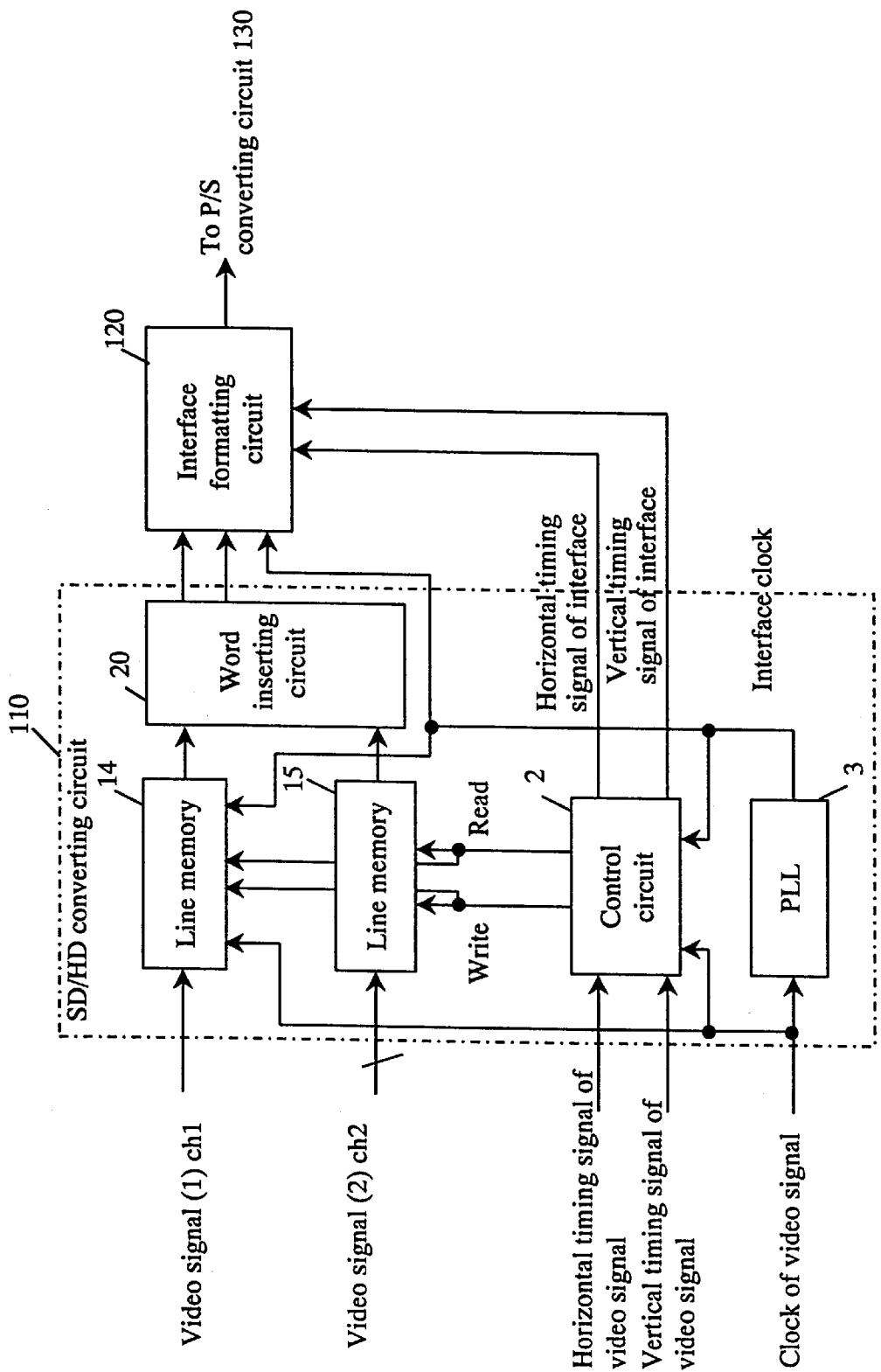
FIG. 6 is a block diagram of an essential part of an SD/HD converting circuit in a transmitter in accordance with a second embodiment of the present invention.
Figure 7:
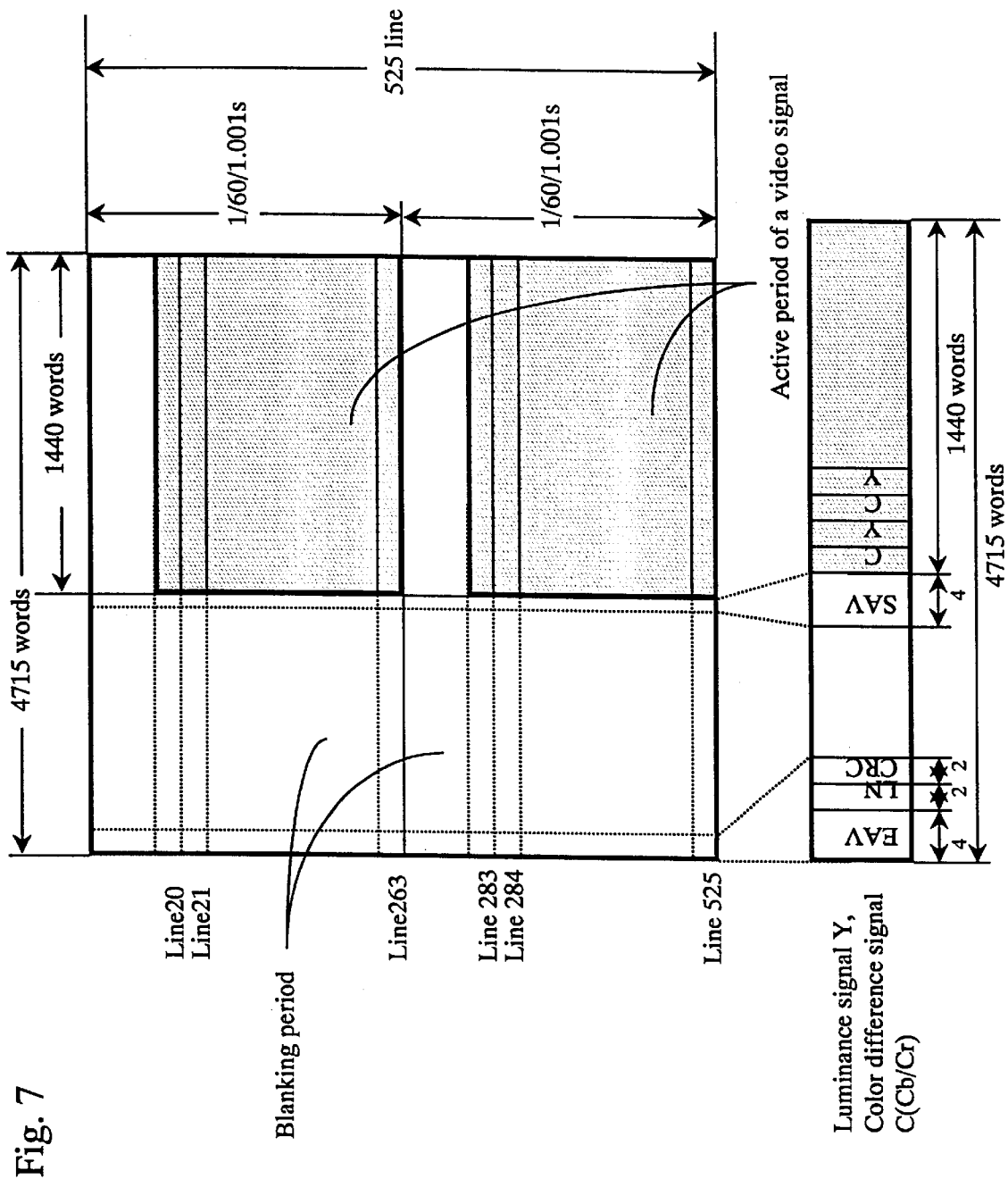
FIG. 7 illustrates a concept of multiplexing two channels of video signals in 480/60 I format in accordance with the second embodiment of the present invention.

A transmission of a video signal of two channels in 480/60 I format is demonstrated with reference to FIG. 6. A video signal in 480/60 I format shown in FIG. 2 is to be converted into a transmission format shown in FIG. 7. The transmitter operates as follows to carry out this conversion. This operation corresponds to that SDTV signals of two channels are input in the structure shown in FIG. 1. FIG. 6 shows an essential part of SD/HD converting circuit shown in FIG. 1. In FIG. 6, SD/HD converting circuit 110 comprises the following elements:

(a) line memory 14 for taking in video signal (2) of channel 1;
(b) line memory 15 for taking in video signal (2) of channel 2;
(c) control circuit 2 for controlling line memories 14 and 15;
(d) PLL circuit 3 for generating a clock of an interface;
(e) word-inserting-circuit 20 for receiving outputs from line memories 14 and 15, and inserting a word corresponding to a pedestal level into a period other than video-signal active period to form the period as a horizontal and vertical blanking periods.

First, Y-signal and C-signal of one channel in the 480/60 I format are multiplexed each other, then they are fed into line memory 14. The active period of them is taken into line memory 14. PLL circuit 3 generates the clock of the interface using a reference video clock of 27 MHz (=13.5 MHz×2) of 480/60 I format due to multiplexing Y and C signals. The interface clock generated is 74.187 MHz={ (4715×525)/(2200×1125)}×74.25/1.001. Y-signal and C-signal of one channel in the 480/60 I format are multiplexed each other, then they are fed into line memory 15. The active period of them is taken into line memory 15. The active periods of the video signals in 480/60 I taken in line memories 14 and 15 are output by using a read-out signal generated in control circuit 2 as well as the interface clock. When line memories 14 and 15 output the active periods, a final word of the active period of 480/60 I format is output approx. at the same timing as an end of the read-out signals (an end of read-out period from one line) of line memories 14 and 15. This is the same operation carried out in the first embodiment. This output at such a timing as discussed above allows the video signals to be output approx. at the same line time-wise as the line of the video signal in the 480/60 I format. As a result, a delay at the conversion can be minimized.

Word-inserting-circuit 20 receives outputs from line memories 14 and 15, and inserts a word corresponding to a pedestal level into a horizontal and vertical blanking periods (the period other than the active period of the video signal). Next, the video signal supplied from circuit 20 is fed into interface formatting circuit 120, where the video signal is multiplexed with a digital sync signal for serial transmission such as EAV, line number, CRC, SAV and the like following the horizontal and vertical timing signals of the interface supplied from control circuit 2. Then the multiplexed signal is output. This output from circuit 120 differs in numbers of scanning lines, words in the active period per line, total words per line; however, the format of digital sync signal such as EAV, SAV, line number, and CRC, is as same as that of SMPTE292M standard and BTA S-004 standard. The periods of the video signals supplied from memories 14 and 15 other than the active period are to be horizontal and vertical blanking periods.

When auxiliary data is multiplexed as the HDTV system does, the data is multiplexed in the horizontal and vertical blanking periods.

The structure discussed above allows the transmitter for the HDTV signal in 1080/60 I format or the like to be multiplexed with the video signal of two channels in 480/60 I format and to transmit the video signal at the HDTV transmission speed of 1.485/1.001 Gbps with a minimized delay free from additional complicated circuitry.

In the demonstration discussed above, the 480/60 I method has been taken as an example in this embodiment; however, other methods are applicable to this embodiment. For instance, when two channels in 480/60 P format need to be transmitted, a number of words per scanning line is 2357 or 2358, and a number of words of active data per scanning line is 1440 In the embodiment discussed above, the video signals of two channels in 480/60 I format are multiplexed each other before the signals are transmitted. However, as far as the number of words of the active data per scanning line is kept equal to or less than the number of words per scanning line, two or more channels can be multiplexed for transmission. For instance, when four channels in 480/60 I format need to be transmitted, the number of words per scanning line may be 4715 or 4714, and the number of words of the active data per scanning line may be 2880.

An occurrence of a pathological pattern should be prevented in this case, thus the case is detailed in a sixth embodiment. In the second embodiment, the serial transmission is described; however, the parallel transmission can effect the same advantage. The line memories take in the active period only of video signals; however, the blanking period and so on can be included. In the second embodiment, video signals of a plurality of channels have the same phase, i.e. delayed amount, when the video signals are fed into the line memories. However, identical signals differs in phase, i.e. delayed amount, can be multiplexed for transmission by the following process: (a) input horizontal and vertical timing signals of the video signals into respective channels, (b) respective channels have a write-in signal to the line memory, (c) read out the video signals from two line memories timed to a timing of the channel having a greater delay.

Figure 8:
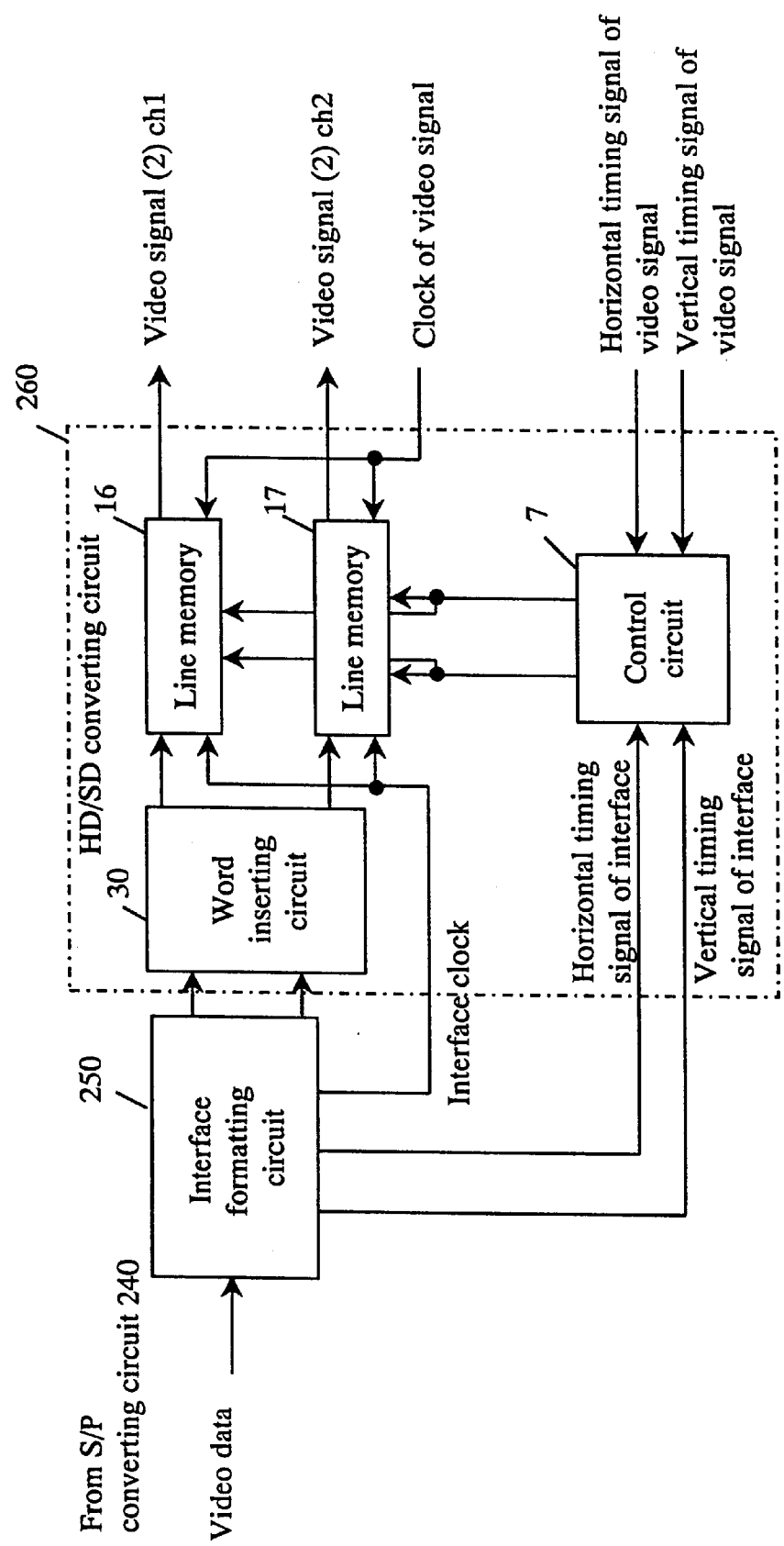
FIG. 8 is a block diagram of an essential part of an SD/HD converting circuit in a receiver in accordance with a second embodiment of the present invention.

FIG. 8 is a block diagram illustrating a structure of a receiver in accordance with the second embodiment. A method of receiving can be carried out by reversing the method of transmission, thus the description thereof is omitted here.

Exemplary Embodiment 3

The third exemplary embodiment refers to a receiver allows to receive signals either in the SDTV format or the HDTV format by detecting the format automatically. A video signal in the SDTV format converted into a transmission signal having a speed of the HDTV, and a video signal in the HDTV format are transmitted to the receiver, so that the receiver can receive both of the video signals in HDTV formats. The third embodiment is demonstrated with reference to FIG. 9 through FIG. 15.

Figure 12:
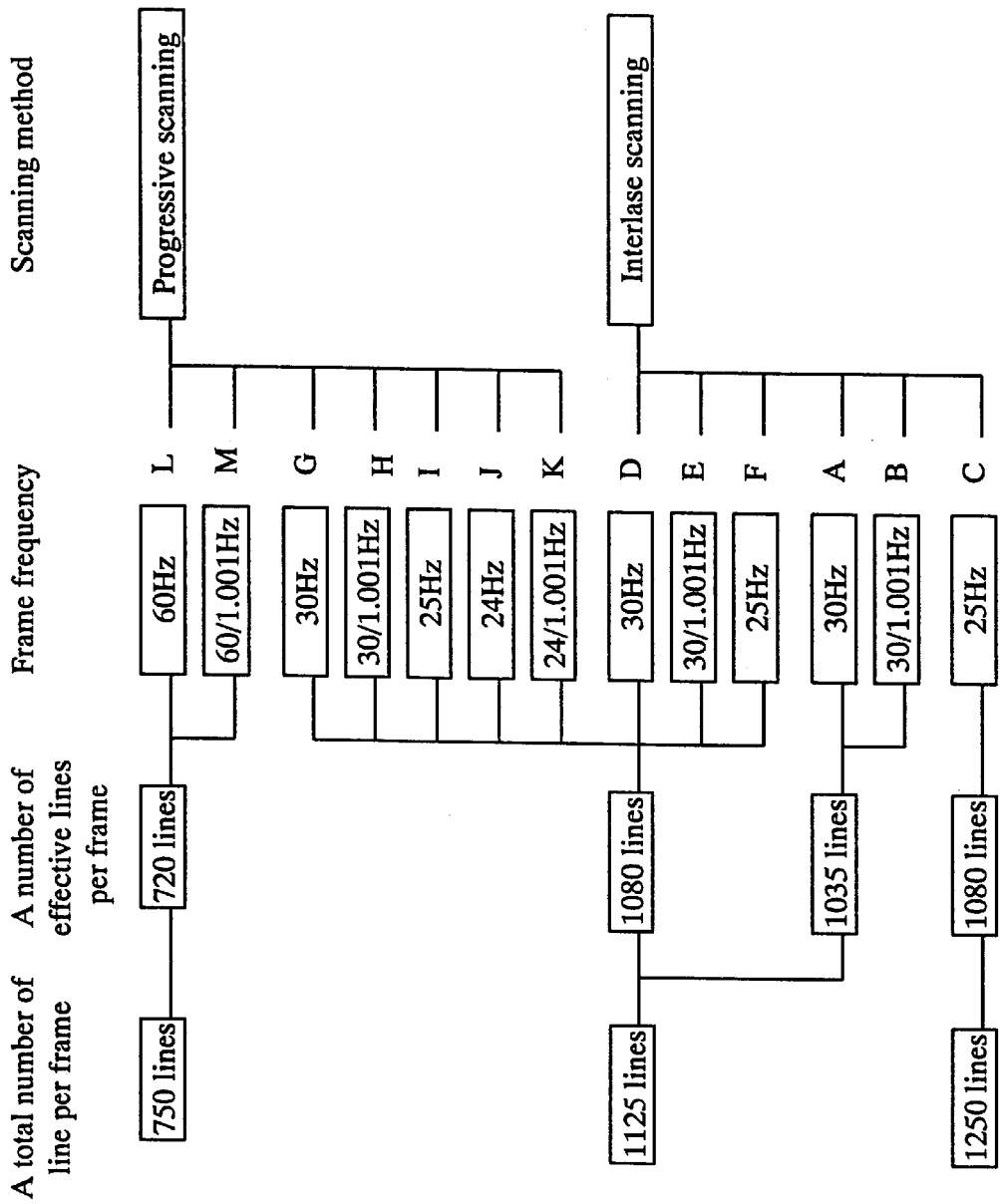
FIG. 12 illustrates relation-chart 1 among parameters of various HDTV methods indicated in the SMPTE292M standard.
Figure 13:
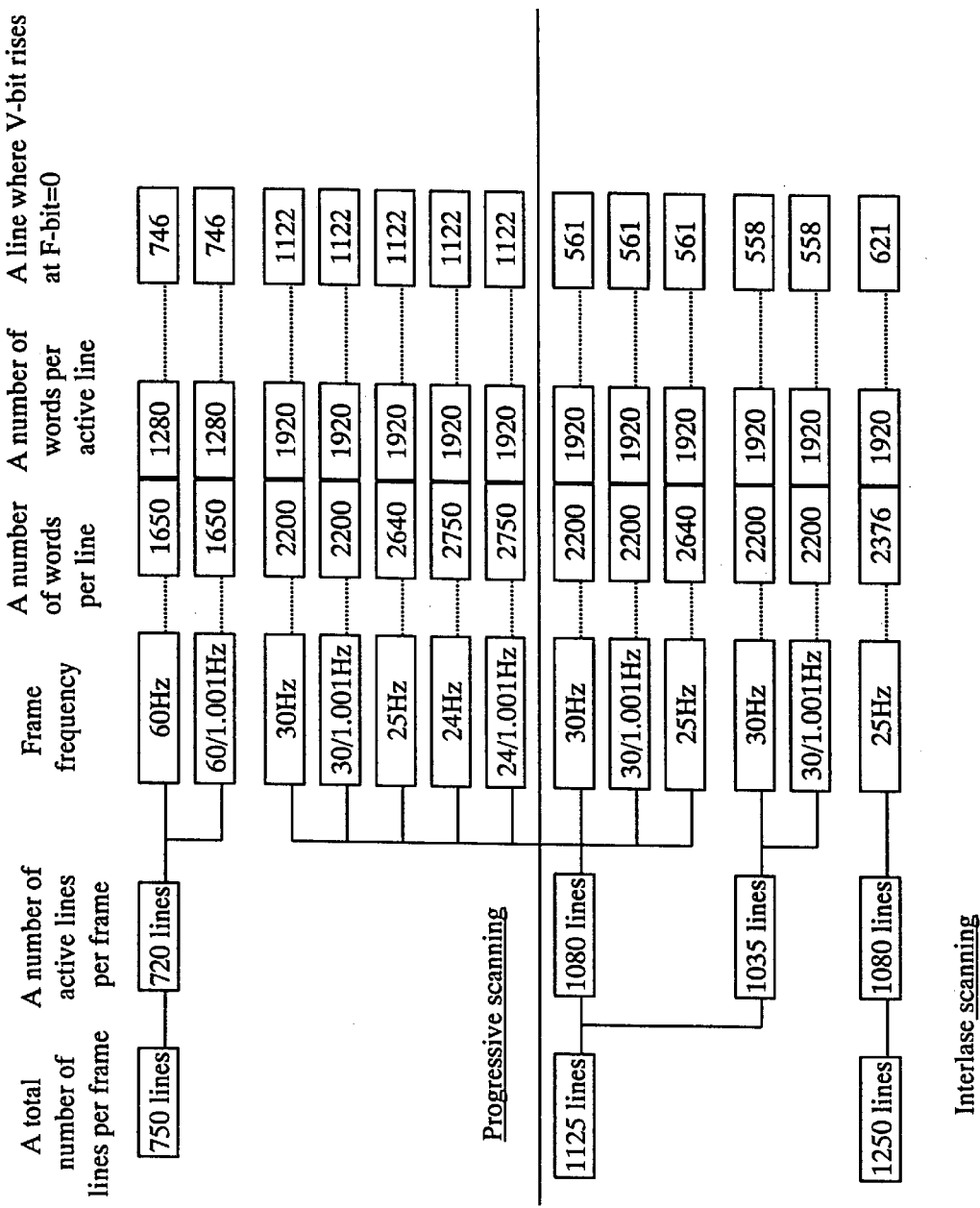
FIG. 13 illustrates relation-chart 2 among parameters of various HDTV methods indicated in the SMPTE292M standard.
Figure 14:
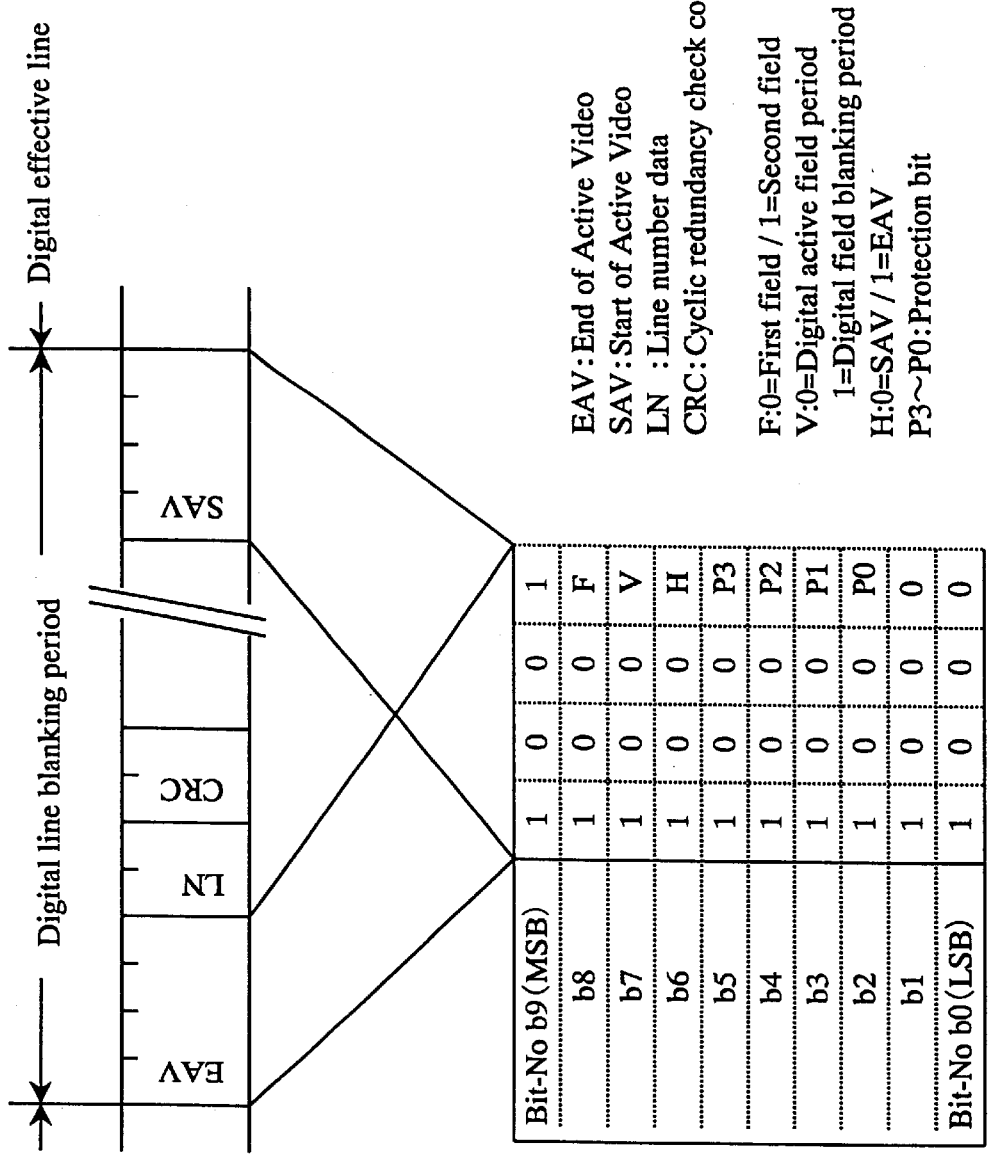
FIG. 14 is a schematic diagram of a digital sync. signal at serial-transmitting of the HDTV method indicated in the SMPTE292M standard.

First, the SMPTE292M standard used for the serial transmitting of video signals in HDTV format and a method of receiving thereof are described with reference to FIG. 12 through FIG. 14. FIGS. 12 and 13 are schematic diagram illustrating parameters in various HDTV formats specified in the SMPTE292M standard. FIG. 14 is a schematic diagram of digital sync signals in various HDTV formats specified, in the SMPTE292M standard; This standard specifies 13 video types in total differing in scanning methods, the numbers of active lines. These 13 types are divided into groups with the following three items: (1) progressive scanning or interlace scanning; (2) the numbers of active scanning lines (1080 lines or 1035 lines); (3) frame frequencies (60 Hz, 30 Hz or 25 Hz). As shown in FIG. 14, a digital sync signal such as EAV, LN (line number data), CRC (detected error data), or SAV, is added to the video signal of any one of these methods before the signal is transmitted.

The receiver detects the digital sync signal added to the video signal for establishing a synchronization, then outputs horizontal and vertical timing signals. It is necessary to know in advance the output timings of the horizontal timing signal and vertical timing signal, i.e. the format of video signals transmitted, in order to output the horizontal and vertical timing signals steadily in case errors occur in the transmission path, which causes errors in the digital sync signal, so that the digital sync signal cannot be detected. A receiver that receives signals in various video formats should therefore automatically detect a format of the input signal in order to output horizontal and vertical timing signals steadily.

Next, a method of receiving video signals by detecting various HDTV formats shown in FIGS. 12 and 13 is described hereinafter. FIG. 13 shows 13 types of HDTV formats. As shown in FIG. 13, each format has a different combination of a number of words per line and a line where V-bit rises when F-bit of the digital sync signal stands at zero '0'. The number of words per line is included between an interval of the EAV shown in FIG. 14 and the next EAV. H-bit stands at one '1' during this interval, therefore, this interval is detected in order to detect the number of words per line. In the case of interlace scanning, where F-bit standing at '1' indicates a first field, and F-bit standing at '0' indicates a second field. In the case of progressive scanning, F-bit stays fixedly at '0'. V-bit standing at '1' indicates a digital field blanking period. Because a line number is added to the two words next to the EAV, the line number at V-bit rising when F-bit stands at '0' is detected. Based on these two detection results, a format of the input video signal can be determined.

Figure 9:
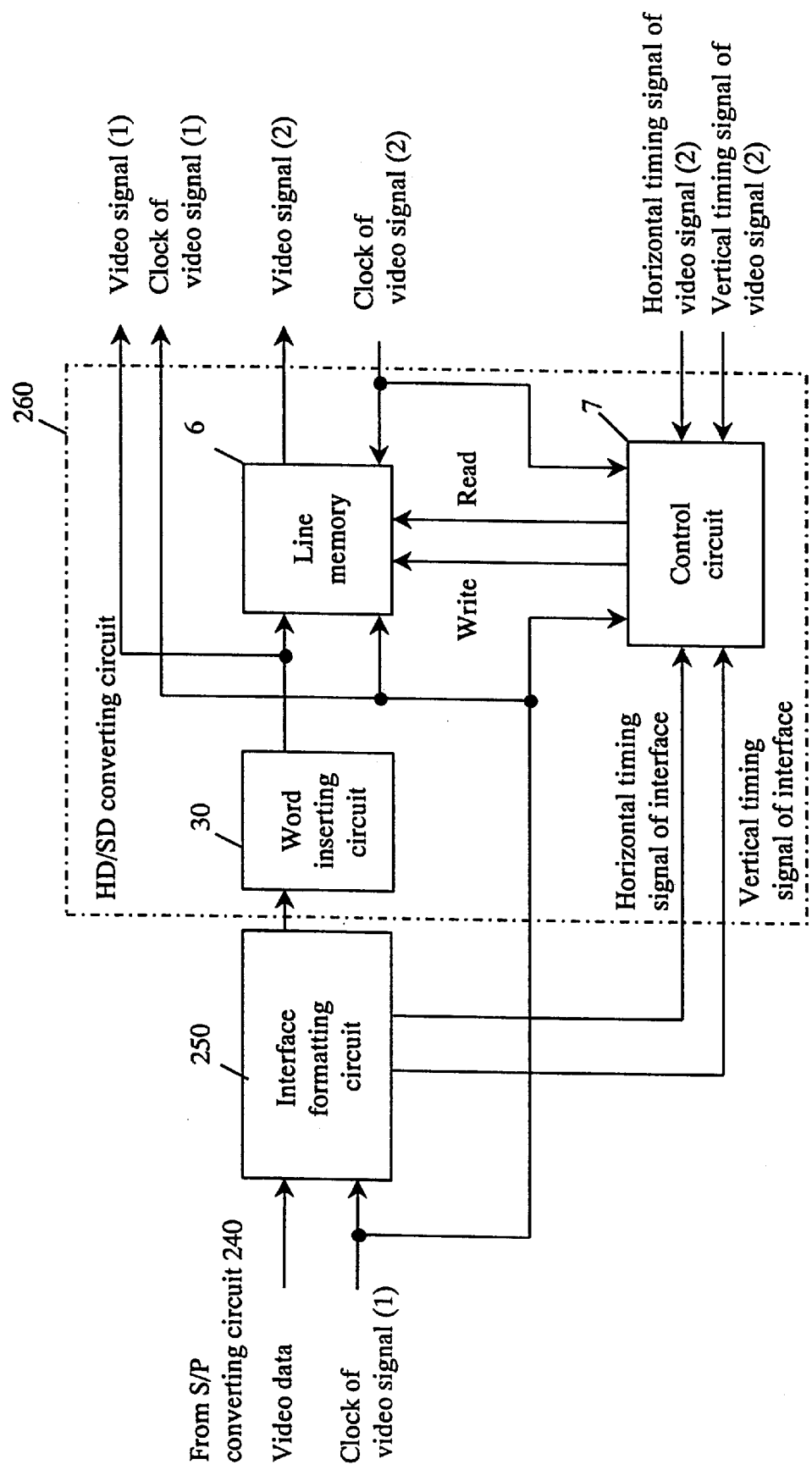
FIG. 9 is a block diagram of an essential part of an SD/HD converting circuit in a receiver in accordance with a third embodiment of the present invention.
Figure 10:
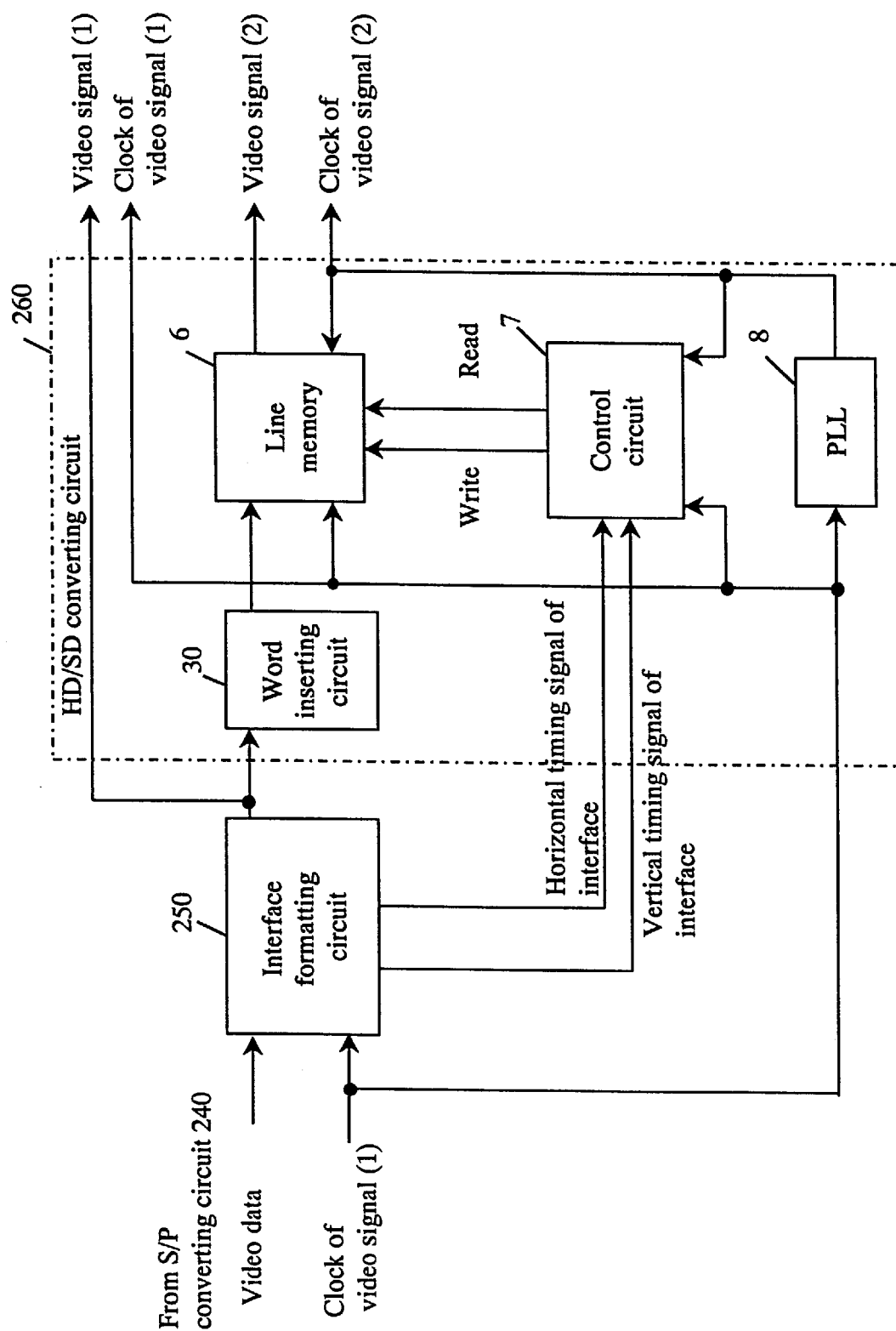
FIG. 10 is a block diagram of an essential part of another SD/HD converting circuit in the receiver in accordance with a third embodiment of the present invention.
Figure 11:
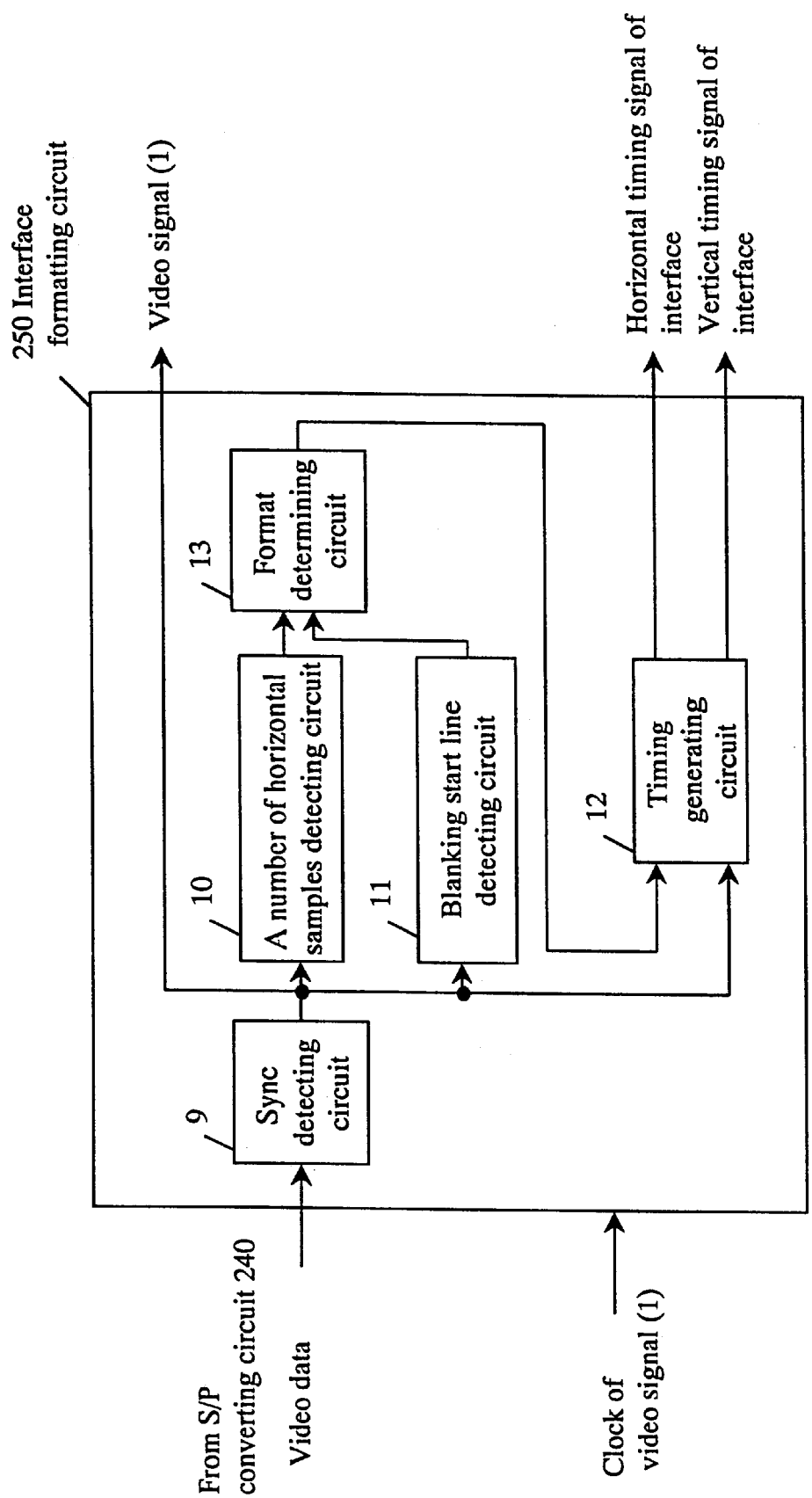
FIG. 11 is a block diagram illustrating a structure of an interface de-formatting circuit in the receiver in accordance with the third embodiment of the present invention.

An operation of the receiver that can automatically detect respective HDTV formats is demonstrated with reference to FIG. 9 through FIG. 11. FIG. 9 and FIG. 10 are block diagrams illustrating essential parts of HD/SD converting circuits of the receiver in accordance with the third embodiment. In FIG. 9 and FIG. 10, the elements common with the first embodiment bear the same reference numbers as the first embodiment, and the descriptions thereof are thus omitted here. FIG. 11 shows a section carrying out an automatic detection, the section is a part of interface deformatting circuit 250 of the receivers shown in FIG. 9 and FIG. 10. In FIG. 9, a video signal serialized and transmitted is fed into circuit 250 from S/P converting circuit 240 shown in FIG. 1. In circuit 250 shown in FIG. 11, first, sync signal detecting circuit 9 detects a digital sync signal added to the video data fed therein. Next, a number of horizontal samples detecting circuit 10 detects an interval (a number of words) where H-bit within EAV of the digital sync signal stands at '1'. Blanking-start-line detecting circuit 11 detects a number of lines within the data of a line number at which V-bit turns from '0' to '1' when F-bit of the EAV of the digital sync signal stands at '0'. Based on the results supplied from detecting circuits 10 and 11, format-determining-circuit 13 determines the format of the video data fed in by comparing respective values of each HDTV format shown in FIG. 13 with the results.

Format-determining-circuit 13 is detailed hereinafter. For instance, when circuit 10 outputs 1650 while circuit 11 outputs 746, the format is determined 720/60 P having a frame frequency of 60 Hz or 60/1.001 Hz. In the case that numbers of total lines, numbers of active lines and scanning methods are respectively identical but frame frequencies are different, such as L and M listed in FIG. 12, a format can be determined by a difference in transmission speeds. In the same manner, when circuit 10 outputs 2200 while circuit 11 outputs 561, the format is determined 1080/60 I (D or E listed in FIG. 12) having a frame frequency of 60 Hz or 60/1.001 Hz. Then based on the result determined in circuit 13, timing generating circuit 12 outputs horizontal and vertical timing signals of the interface. This structure allows circuit 12 to establish a synchronization steadily even at an transmission error as well as generate horizontal and vertical timing signals. Because the transmitted signal is in the HDTV format, i.e. an intrinsic signal format, video signal (1) as well as video clock (1) supplied from circuit 250 are used as intrinsic signals.

Next, an operation of another receiver is described hereinafter. This receiver detects automatically a video signal in the SDTV format-converted to a transmission signal having a speed of HDTV format and then transmitted—as well as a video signal in the HDTV format.

Figure 15:
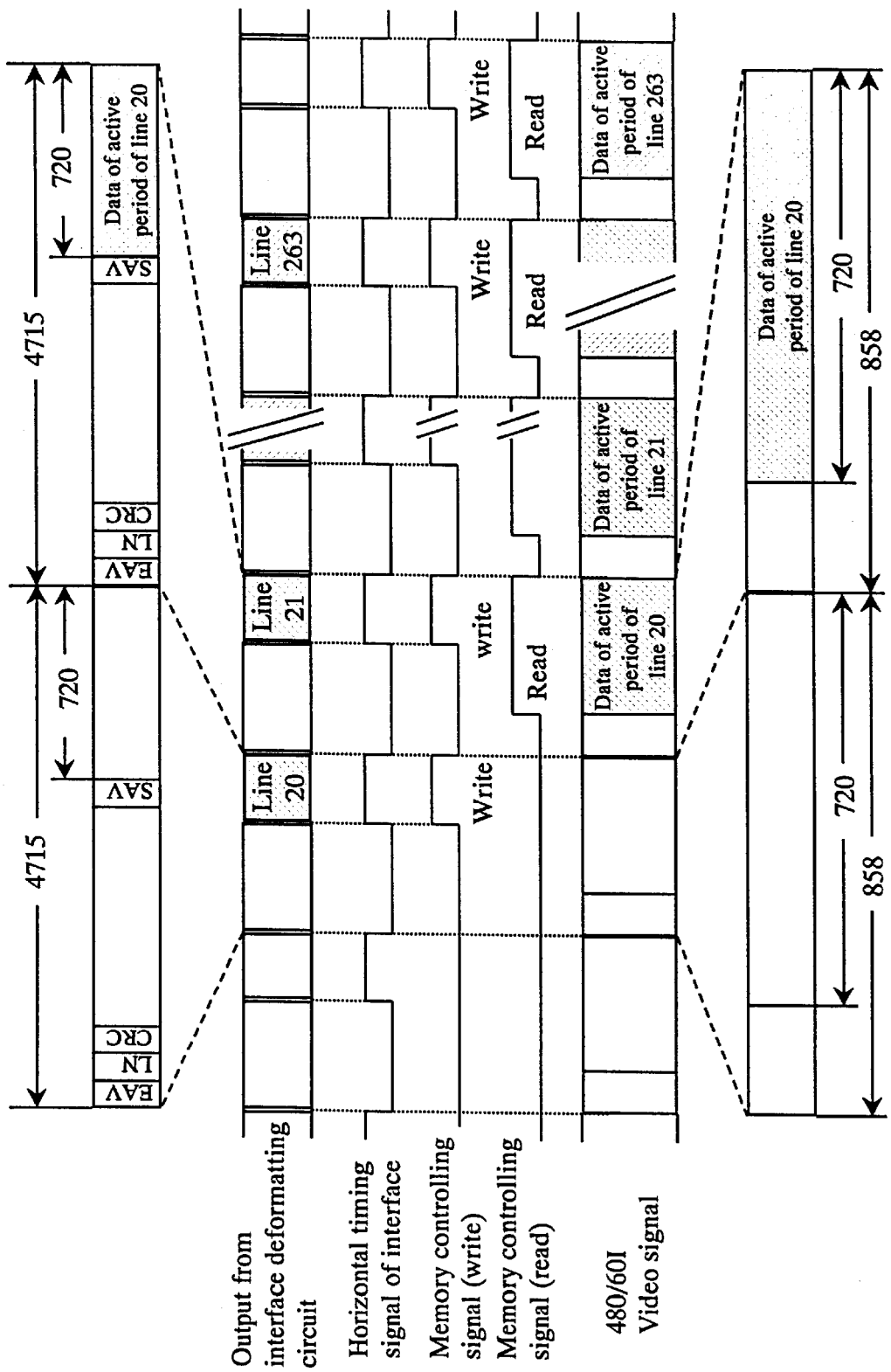
FIG. 15 is a timing chart illustrating an operation of the receiver in accordance with the third embodiment of the present invention.

First, when the video signal in the SDTV format-converted to a close speed to the HDTV format—is transmitted as described in the first embodiment, the receiver shown in FIGS. 9 and 10 in accordance with the third embodiment operates as follows: FIG. 11 shows interface deformatting circuit 250 of the receivers shown in FIGS. 9 and 10. FIG. 15 is a timing chart illustrating the timing of the video signal (the signal shown in FIG. 3) in the SDTV format and converted into a transmission signal for the HDTV format as described in the first embodiment. The receiver receives this converted video signal having the timing as illustrated in FIG. 15. In FIG. 9, the receiver automatically detects the HDTV format, and at the same time, a number of horizontal samples detecting circuit 10 detects an interval (a number of words) where H-bit within EAV of the digital sync signal stands at '1'. Blanking-start-line detecting circuit 11 detects a number of lines within the data of a line number at which V-bit turns from '0' to '1' when F-bit of the EAV of the digital sync signal stands at '0'. Then in format-determining-circuit 13, when the results of detection by circuits 10 and 11 are listed in FIG. 13, the received signal is determined one of HDTV formats, whereas circuit 10 detects 4715 or 4714 when the video signal in the 480/60 I SDTV format—converted to a transmission signal having a speed close to the HDTV format—is transmitted. Circuit 11 detects 264 as illustrated in FIG. 3. Circuit 13 thus determines the video signal in 480/60 I format as a signal converted to a transmission signal having a speed close to that of HDTV format when these values discussed above are detected and supplied thereto. In FIG. 9, HD/SD converting circuit 260 receives an output from circuit 250 and converts it to video parallel data in SDTV format. Circuit 260 comprises the following elements:

(a) line memory 6 for taking in a video signal within an active period in 480/60 I format;

(b) control circuit 7 for controlling line memory 6; and (c) word reducing circuit 30 for reducing a pedestal level inserted into periods other than the active period.

Circuit 260 operates as follows: Control circuit 7 receives horizontal and vertical timing signals of the interface supplied from interface-deformatting-circuit 250, and takes in a video-data-active-period, then controls line memory 6 so that the transmitter outputs the signals following the 480/60 I format which is used prior to the conversion.

As shown in FIG. 10, the horizontal and vertical timing signals as well as the clock intrinsic to the video signal are not supplied from outside of circuit 260, but PLL circuit 8 generates the proper clock, and the control circuit receives the timing signals and generates reading signal for line memory 6.

The structure discussed above allows the receiver for the HDTV format, such as 1080/60 I format, to detect automatically the video signal in the SDTV format—converted to a transmission signal having the speed close to that of the HDTV format—as well as the video signal in the HDTV format without modifying substantially the circuitry of the HDTV receiver. This receiver also can restores the converted video signal to the original format, i.e. SDTV format, with a minimized delay before outputting the video signal.

In the description discussed above, the video signal in 480/60 I SDTV format is used; however, other formats such as 480/60 P is applicable. For instance, when the 480/60 P format is used, a number of horizontal samples detecting circuit 10 in FIG. 11 detects 2357 or 2358, and blanking-start-line detecting circuit 11 detects '1' so that the signal transmitted is determined in the 480/60 P format.

In the above description, an interval where H-bit stands at '1', i.e. the interval of EAV, is used in circuit 10; however, an interval where H-bit stands at '0', i.e. the interval of SAV, can be used.

Circuit 10 uses the number of samples in one line; however, it can use instead a number of samples in a horizontal blanking period (an interval where H-bit turns from '1' to '0', i.e. an interval from EAV to SAV).

Circuit 11 uses the line number when V-bit rises at F=0; however, it can use instead a number of lines between falling and rising of the V-bit at F-bit=0. In other words, a number of active lines in a first field at interlace scanning, or a number of active lines per frame at progressing scanning can be used instead.

Exemplary Embodiment 4

Figure 16A:
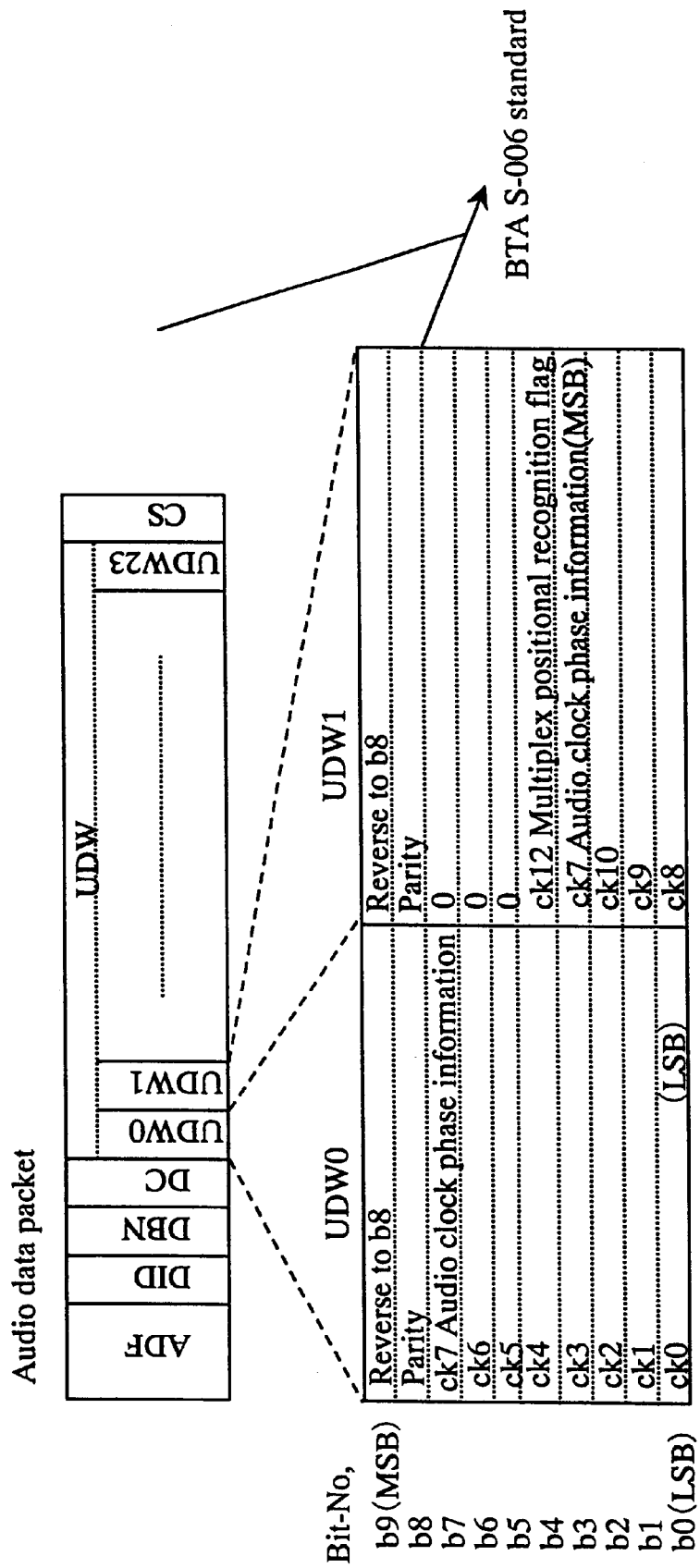
FIG. 16(A) illustrates a conventional audio data packet in accordance with the BTA S-006 standard.
Figure 16B:
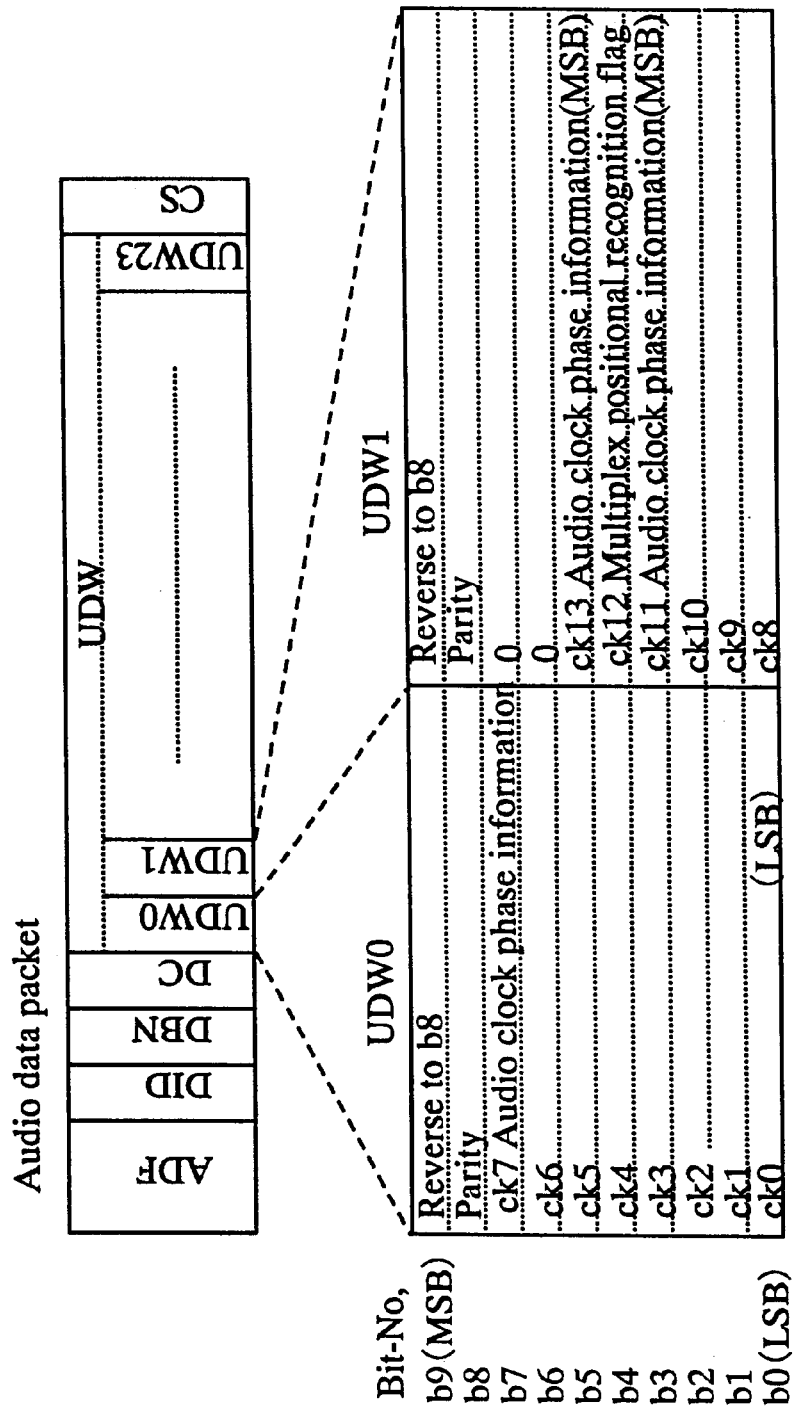
FIG. 16(B) illustrates an audio data packet in accordance with a fourth embodiment of the present invention.
Figure 17:
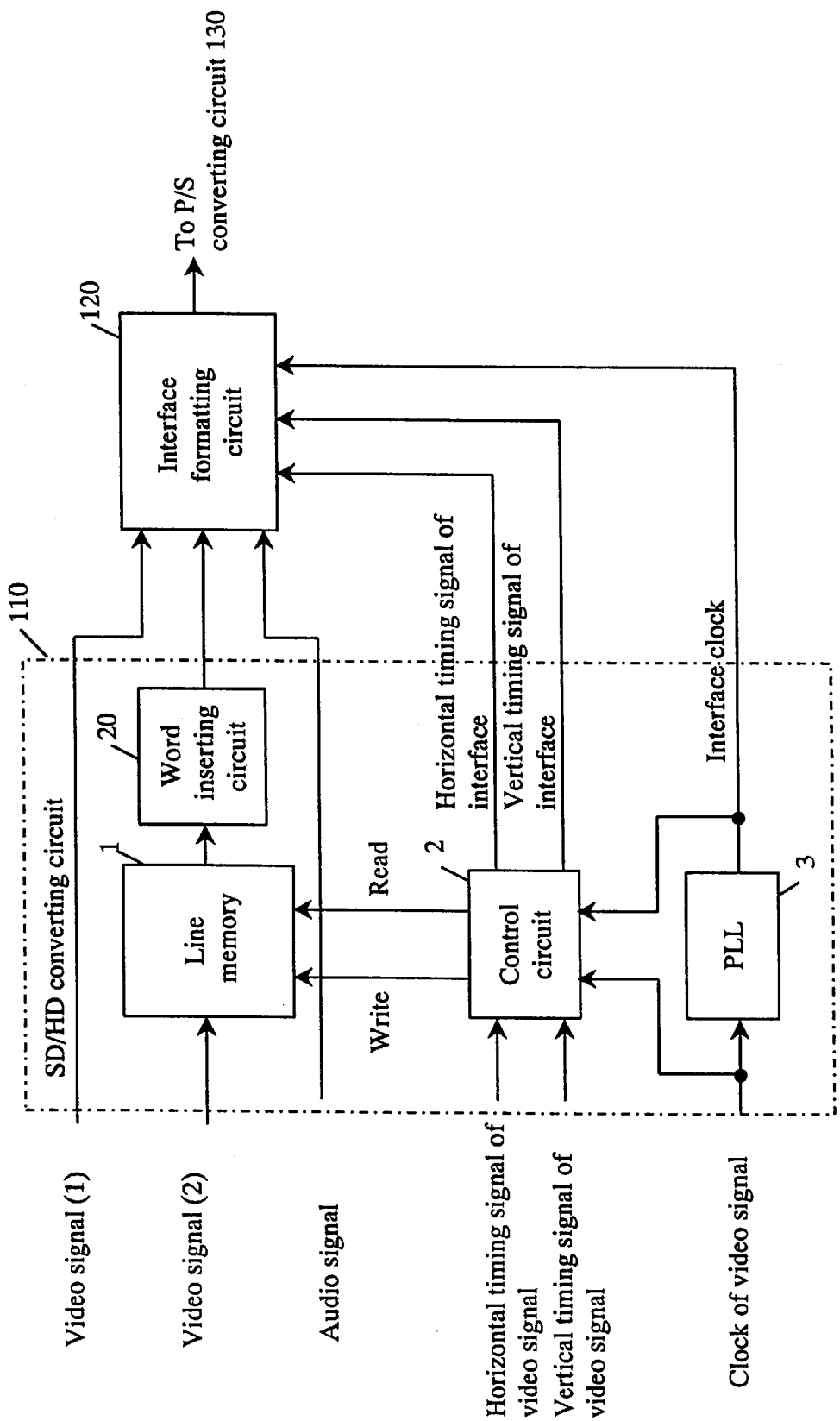
FIG. 17 is a block diagram of an essential part of an SD/HD converting circuit in a transmitter in accordance with the fourth embodiment of the present invention.
Figure 18:
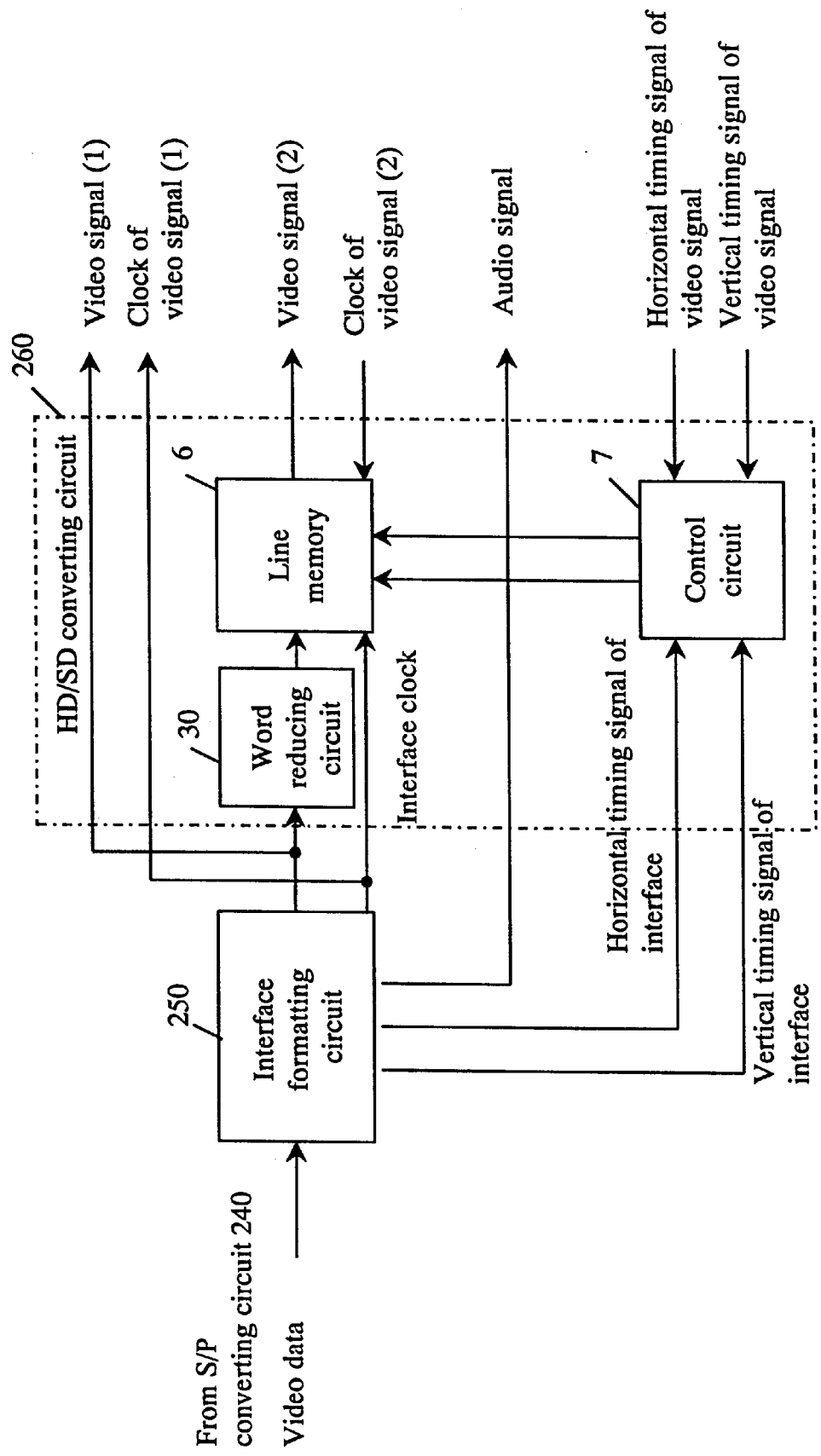
FIG. 18 is a block diagram of an essential part of an HD/SD converting circuit in a receiver in accordance with the fourth embodiment of the present invention.

The fourth exemplary embodiment refers to a method of transmitting an audio signal in "480/60 I" format using the transmission format shown in FIG. 3. The fourth embodiment is demonstrated with reference to FIGS. 16–18. The elements common to the first embodiment shown in FIG. 1 bear the same reference marks and the descriptions thereof are omitted here. FIG. 16(A) illustrates a conventional audio data packet in accordance with the BTA S-006 standard. FIG. 16(B) illustrates an audio data packet of the present invention, where phase information of audio clocks in UDWO, UDWI shown in FIG. 16(A) are expanded to 13-bit. FIG. 17 shows an essential part of an SD/HD converting circuit of a transmitter, where the converting circuit converts a video signal in 480/60 I format into a transmission signal having a speed of 1.485/1.001 Gbps and multiplexes an audio signal to the video signal. FIG. 18 shows an essential part of an HD/SD converting circuit of a receiver, where the converting circuit reproduces a video signal in 480/60 I format from the video signal shown in FIG. 3, and reproduces a multiplexed audio signal. First, a method of transmitting an audio signal when an HDTV signal is transmitted in serial.

Regarding the serial transmission of the HDTV signal in the 1080/60 I format or the like, the SMPTE292M standard and the BTA S-004 standard specify the transmitting method. In the case of the serial transmission, auxiliary data such as an audio signal can be multiplexed in a horizontal blanking period of the HDTV signal. A method of multiplexing audio signals in the serial transmission of the HDTV signals is specified in the SMPTE299M standard and BTA S-006 standard. The BTA S-006 standard specifies, as shown in FIG. 16(A) illustrates, that an. audio-data-packet including a packetized audio signal is multiplexed to the horizontal blanking period of a video signal before the signal is transmitted. In the receiver, the audio-data-packet is separated from the horizontal blanking period and converted into the audio signal before being output. In the transmitter, an audio-clock-phase-information (ck0–ck11 shown in FIG. 16(A)) indicating an audio-signal-input-timing with respect to the video signal is multiplexed in the audio-data-packet. This audio-clock-phase-information is used in the receiver as a timing signal at converting the audio packet multiplexed to the blanking period into the audio signal. This audio-clock-phase-information is expressed in a number of video clocks from a first word of EAV just before the video signal to a rise of an input audio sampling clock. In other words, the audio-clock-phase-information needs to indicate a number of words per scanning line (horizontal line) of the video signal. However, in the SMPTE299M standard and BTA S-006 standard, the audio-clock-phase-information is expressed in 12-bit (max.4096) as indicated with ck0–ck11 in FIG. 16(A). On the other hand, in the present invention requires that the audio signal needs to be multiplexed as the audio-data-packet to the horizontal blanking period of the signal shown in FIG. 3. In this case, a number of words per scanning line is 4715, thus the number cannot be expressed in 12-bit (max. 4096).

The present invention expands the audio-clock-phase-information in the audio-data-packet from 12-bit to 13-bit when a video signal having words more than 4096 (12-bit) per scanning line is multiplexed with an audio signal before being transmitted. When the audio-clock-phase-information is expanded to 13-bit, the bit-No. 5 of UDW1 not engaged in the SMPTE299M or BTA S-006—an audio-transmission-standard for HDTV signal—is used for this 13th bit that is a most significant bit (MSB) of the audio-clock-phase-information as shown in FIG. 16(B). As such, when the audio-clock-information needs the 13th bit, the bit-No. 5 of UDW1 in the audio-data-packet is used for the MSB. This process allows the transmitter of HDTV signals including 1080/60 I format and the like to multiplex a video signal having more than 4096 words per scanning line with an audio signal. The HDTV signal in 1080/60 I format needs only 12-bit to be multiplexed with an audio signal, in this case, the 13th bit remains zero '0' as usual. Thus the transmitter is compatible with this format, so that the same circuitry can transmit the HDTV signals. The receiver uses the 12-bit of the audio-clock-information and an expanded 13th bit, the MSB of the audio-clock-information, thereby reproducing the audio signal transmitted in the packet.

When a video signal in '480/60 I' format is multiplexed with an audio signal and then transmitted through the process shown in FIG. 3, the transmitter and receiver operate as follows: In the transmitting circuit shown in FIG. 17, multiplexing the audio signal to the video signal requires interface-formatting-circuit 120 to carry out the following process:

(a) packetizing the audio signal into an audio-data-packet;
(b) expanding an audio-clock-phase-information to 13-bit; and
(c) multiplexing phase-information of a sampling clock of the audio signal indicated with a number of samples in horizontal direction of the video signal fed into circuit 120 before transmitting the video signal.

A point to be modified from the conventional standard is only to expand the audio-clock-phase-information to 13-bit, and other points remain in accordance with the standard.

In the receiver, as shown in FIG. 18, interface-deformatting-circuit 250 depacketizes the audio-data-packet from the blanking period of the video signal, and converted the packet to the audio signal before outputting. At this time, the audio-clock-phase-information in the HDTV audio-data-packet is processed as 13-bit signal. This structure allows the transmitter and receiver to multiplex an audio signal to a video signal having words per scanning line more than 4096 and to transmit the multiplexed signal. In the description discussed above, a signal in the '480/60 I' format is converted as shown in FIG. 3, and then transmitted at a serial transmission speed of 1.485/1.001 Gbps. However, other video signal having words per scanning line more than 4096 can be multiplexed with an audio signal in the same manner.

Exemplary Embodiment 5

In the first embodiment discussed previously, the video signal in the SDTV format is converted into a transmission signal having a speed close to that of the HDTV signal by expanding the horizontal blanking period of the video signal. This fifth embodiment refers to a method and apparatuses of transmitting an SDTV video signal at a transmitting speed of the HDTV video signal by expanding the horizontal blanking period as well as the number of lines. First, a method and apparatus of transmission through converting an SDTV video signal in the '480/60 I' format are demonstrated with reference to the accompanying drawings. The elements common to the first embodiment shown in FIG. 1 bear the same reference marks as those in FIG. 1, thus the descriptions thereof are omitted here.

Figure 19:
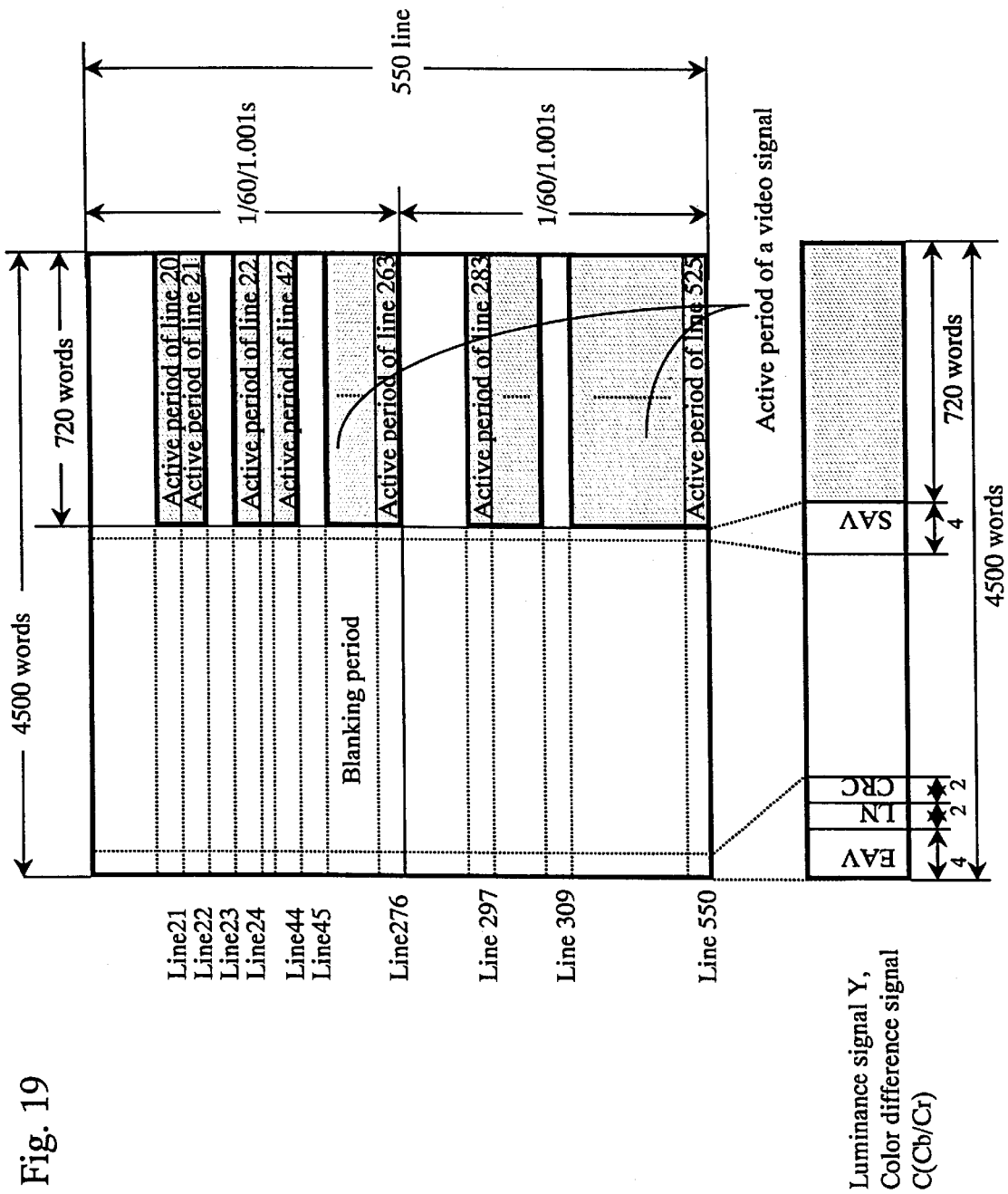
FIG. 19 illustrates a concept of a transmission format of a converted video signal in 480/60 I form in accordance with a fifth embodiment of the present invention.
Figure 20:
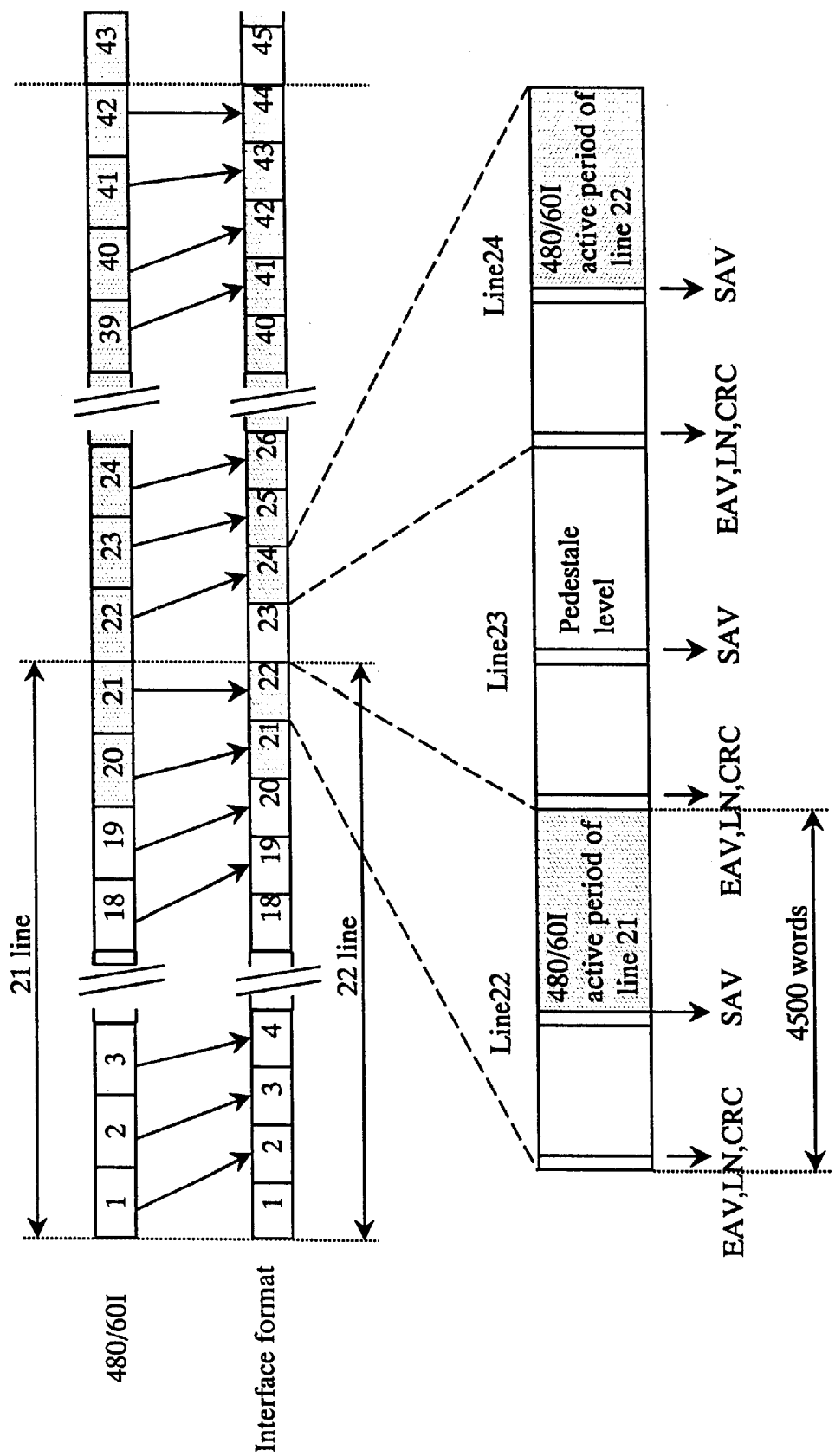
FIG. 20 illustrates another concept of a transmission format of a converted video signal in 480/60 I form by the transmitter in accordance with the fifth embodiment of the present invention.
Figure 21:
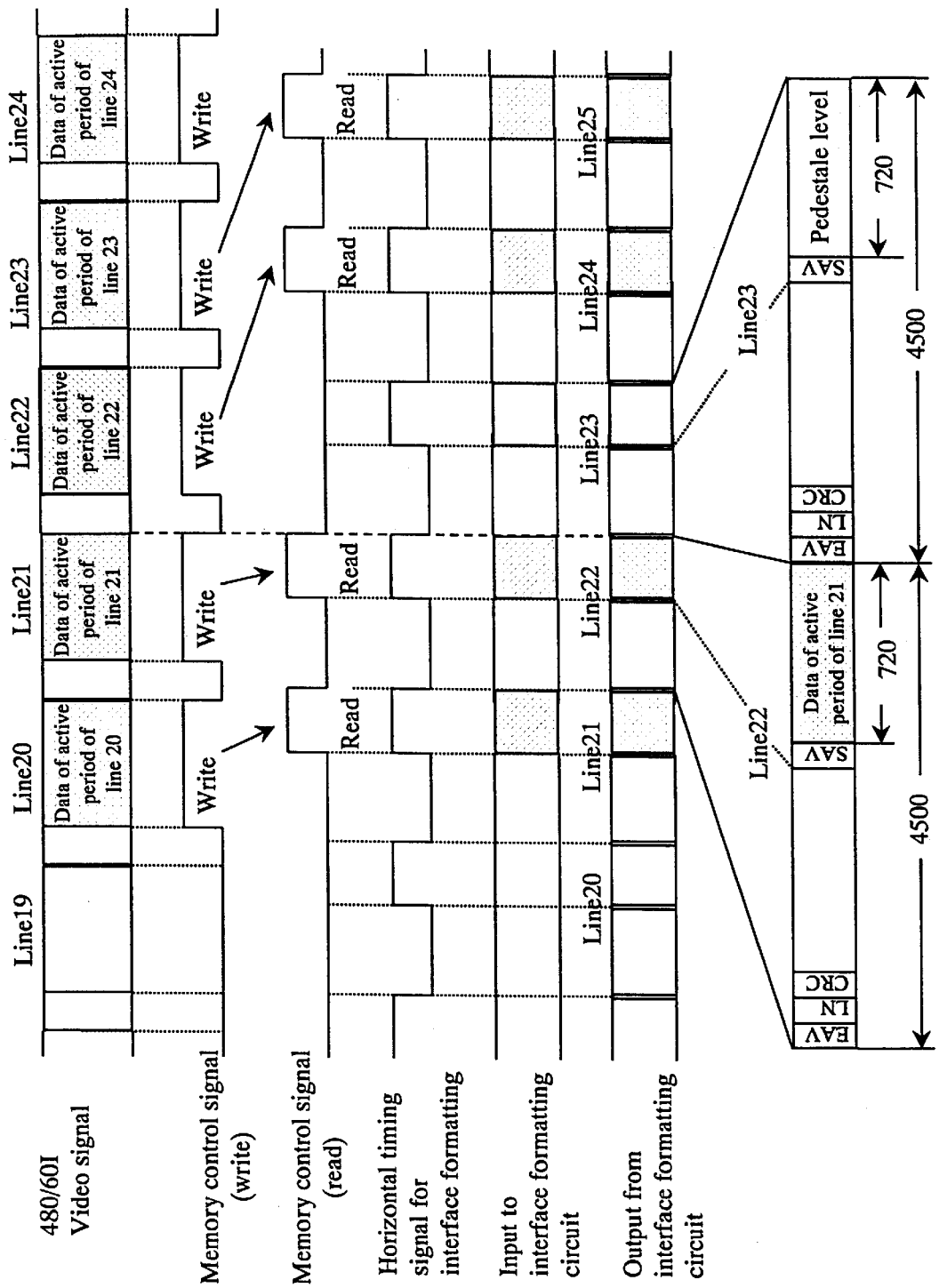
FIG. 21 is a timing chart illustrating an operation of a transmitter in accordance with the fifth embodiment of the present invention.

FIG. 19 and FIG. 20 illustrate examples of converting a video signal in the '480/60 I' format into a transmission speed of 1.485/1.001 Gbps. FIG. 21 is a timing chart of a transmitter being engaged in transmitting the video signal in the '480/60 I' format into a transmission speed of 1.485/1.001 Gbps.

First, a method of transmission is demonstrated. A number of pixels per frame of the HDTV in '1080/60 I' format amounts to 1125×2200, and the transmission rate is 1.485/ 1.001 Gbps. On the other hand, a number of pixels per frame of the SDTV in '480/60 I' format amounts to 525×858. When this signal is converted into a transmission speed of 1.485/1.001 Gbps, respective numbers are changed as follows: A number of active samples (words) is 720, a number of active lines per frame remains the same as that in the '480/60 I' format, and a number of samples in the horizontal blanking period as well as a number of lines per frame is increased, so that the transmission speed is converted into the same speed as that of the HDTV signal. This method allows the SDTV signal in the '480/60 I' format to be converted into a transmission signal having the same speed as that of the HDTV signal by keeping the same number of samples in the horizontal lines and with a minimized transmission delay. After the conversion, the number of lines per frame is close to 525 which is intrinsic to the '480/60 I format', and (a number of lines after the conversion)×(a number of samples in a horizontal line after the conversion) becomes 2200×1125, i.e. the total number of pixels per frame in the '1080/60 I format'. These numbers can minimize the transmission delay. In other words, a number of lines in 480/60 I format needs to be 550, and a number of horizontal samples needs to be 4500. Further, as shown in FIG. 20, the ratio of 525 lines (480/60 I format) vs. 550 lines (after the conversion) equalizes the time for 21 lines of 480/60 I format with the time for 22 lines after the conversion. One line is thus added to the 21 lines in 480/60 I format, then the signal is converted to a signal having 550 lines in total. The active period of the line to be added needs to be a pedestal level. To be more specific, the line of 22×n+1 of the converted signal is to be an additional line (n is an integer from 0 and onward in ascending order) and an active period of this additional line stays at a pedestal level. Therefore, when the video signal having 525 lines in 480/60 I format is converted into a signal having 550 lines, in the '480/60 I' format, assume that p/21=m (m is rounded up), the 'p-th' line is inserted into a place of (m+p)th line of the signal having 550 lines. For instance, the 20th line in '480/60 I' format is inserted into the 21st line after the conversion, the 22nd line in 480/60 I format is inserted into the 24th line after the conversion, and the 525th line in 480/60 I format is inserted into the 550th line after the conversion. FIG. 19 illustrates a signal undergone such a conversion process.

Next, an operation of the transmitter is demonstrated hereinafter. The transmitter used in the first embodiment shown in FIG. 4 can function in accordance with this fifth embodiment. Thus the operation is described with reference to FIG. 4. Line memory 1 takes in an active period of a video signal in '480/60 I' format. PLL circuit 3 produces an interface clock of 74.25/1.001 MHz from a clock of 13.5 MHz of the video signal in '480/60 I' format. The active period of the video signal taken into line memory 1 is supplied therefrom with a read-out signal generated in control circuit 2 as well as the interface clock. When the active period is supplied from line memory 1, the 22×n+1st line ('n' is an integer in an ascending order from zero '0') is not used to read out, but a pedestal level is inserted into this line instead. Therefore, when the video signal in 480/60 I format is converted into a format having a number of lines of 550, the 'p'th line of the video signal is transmitted as 'm+p'th line of a signal in 550 lines format in the case of P/21=m ('m' is rounded up). Next, the video signal tapped off from line memory 1 travels through word-inserting-circuit 20 and fed into interface-formatting-circuit 120. In circuit 120, the video signal is multiplexed with a digital sync signal for serial transmitting such as EAV, a line number, CRC, SAV, following the horizontal and vertical timing signals of the interface. These timing signals are supplied from control circuit 2. The video signal is output with the digital sync signal in a format in accordance with the SMPTE292M standard or BTA S-004 standard, although a number of scanning lines, a number of words for an active period per line, and a total number of words per line are different from those of the above standards. The periods other than the active period of the video signal supplied from line memory 1 should be horizontal and vertical blanking periods where words corresponding to the pedestal level are inserted. An audio signal, auxiliary data or the like is multiplexed to these horizontal and vertical blanking periods, when necessary. This is the same manner as the HDTV format.

The structure discussed above allows a transmitter to convert a video signal in '480/60 I' into a transmission signal having a speed of the HDTV format. This transmitter needs only a little modification from a transmitter of the HDTV format, and outputs video signals with a minimized delay.

In the above demonstration, the video signal in the '480/60 I' format is used; however, the transmitter can handle signals in other formats as well. For instance, when handling a video signal in a '480/60 P' format, the transmitter converts the characteristics of 525 scanning lines and 60/1.001 Hz frame frequency into 550 scanning lines and 2250 words per scanning line, then transmits the signal at 1.485/1.001 Gbps. The transmitter also can convert video signals of plural channels of the SDTV format into transmission signals having a speed of the HDTV format before outputting. This is described in the second embodiment. As such, the video signal in the SDTV format can be set at 1.485/1.001 Gbps, i.e. a transmission speed of the HDTV signal, by expanding the horizontal blanking period as well as a number of lines.

Exemplary Embodiment 6

Figure 22:
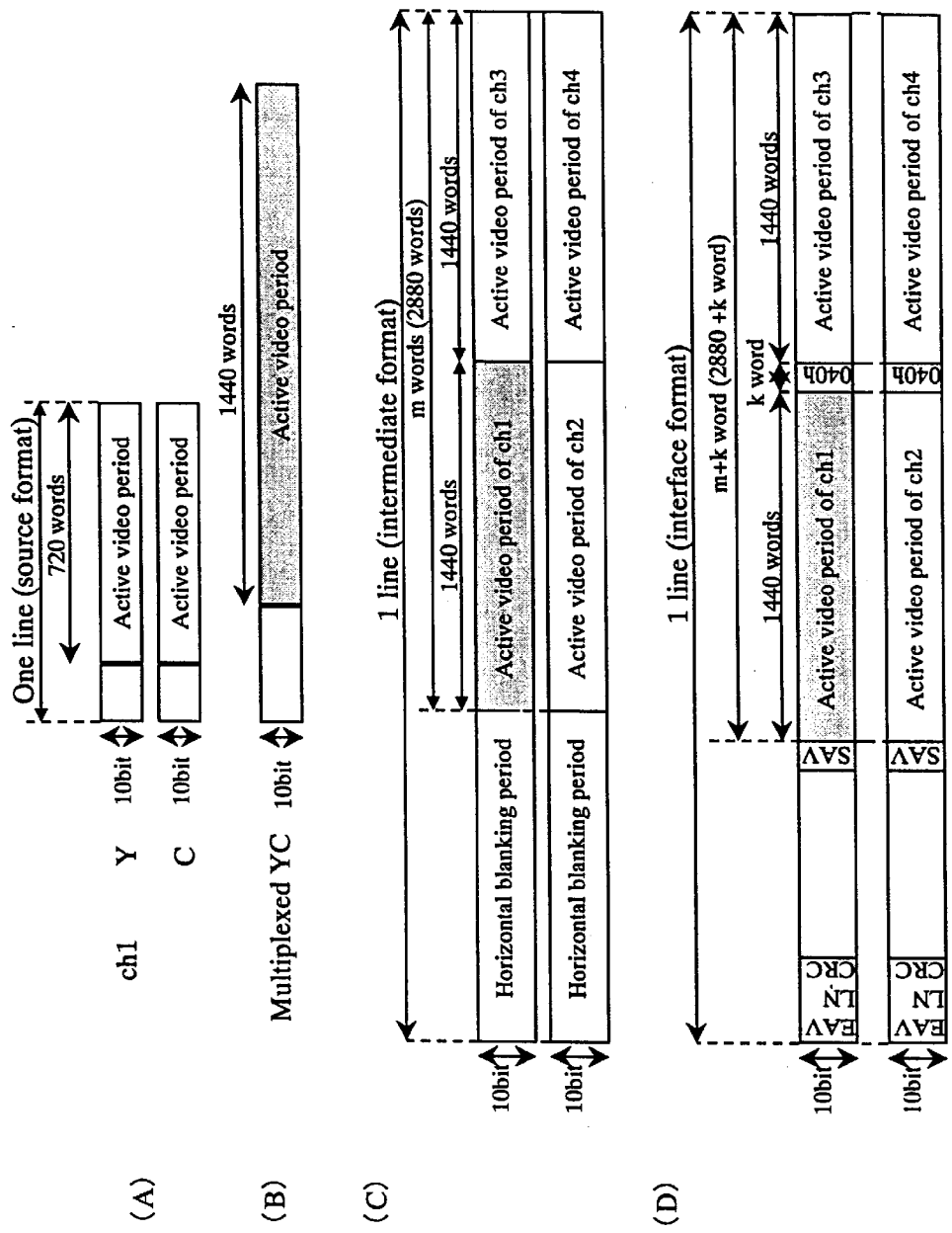
FIG. 22 illustrates a concept of multiplexing four channels of video signals in 480/60 I format in a transmitter and a receiver in accordance with a sixth embodiment of the present invention.
Figure 23:
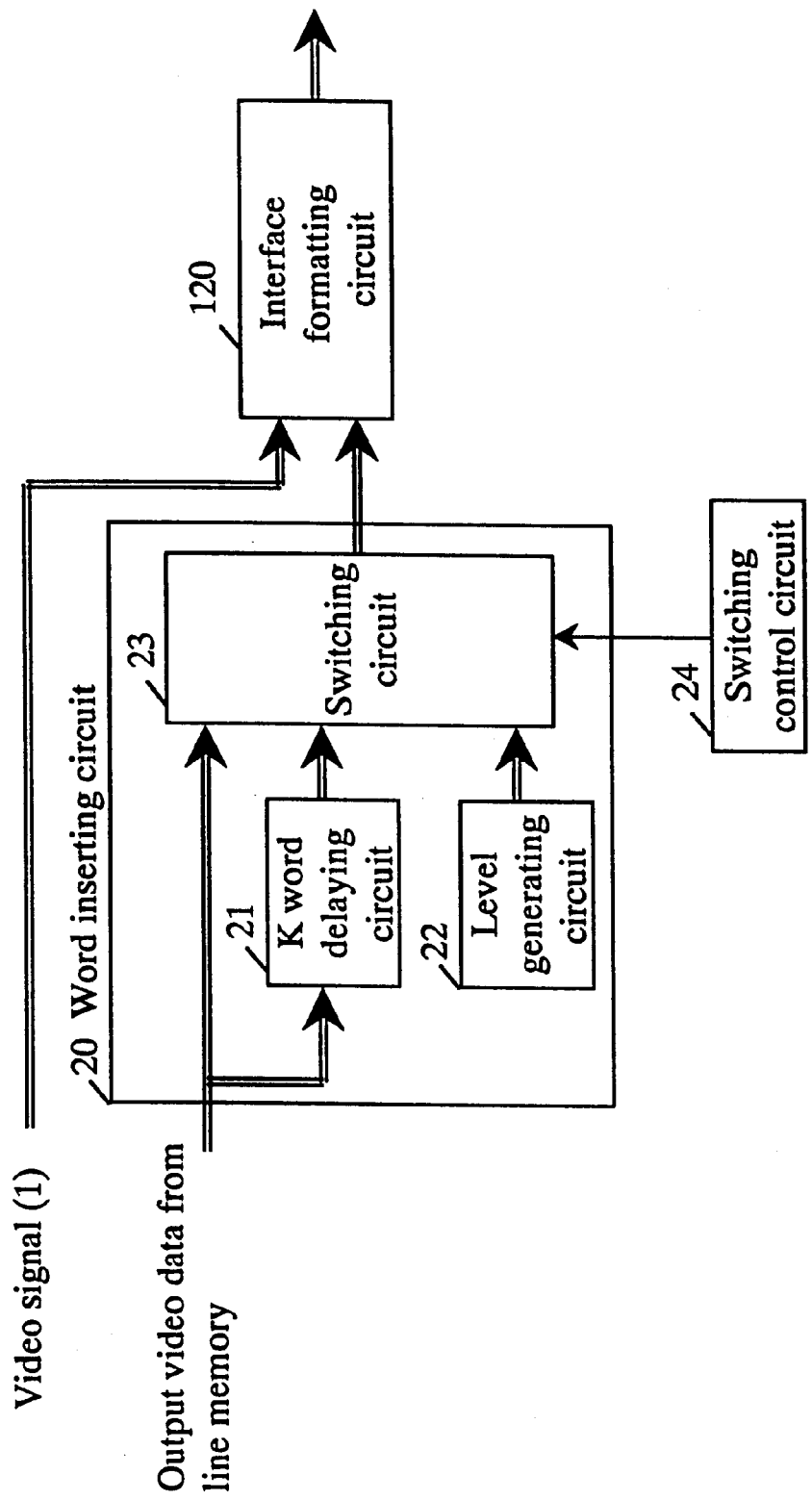
FIG. 23 is a bock diagram illustrating an essential part of a word inserting circuit of SD/HD converting circuit in the transmitter in accordance with the sixth embodiment of the present invention.

The sixth embodiment refers to a transmitting method which converts video signals of a plurality of channels in the SDTV format into transmission signals having a transmission speed close to that of the HDTV format. First, video signals of four-channels in '480/60 I' and SDTV format shown in FIG. 3 are converted into transmission signals having the speed close to that of the HDTV format, then the converted signals are output of one channel. This embodiment is detailed with reference to FIGS. 1 and 22. In the SD/HD converting circuit shown in FIG. 1 needs to be modified so that the line memory shown in FIG. 6 can receive four channels of the SDTV signals and output two channels; however, a drawing illustrating the modified circuit is omitted here. FIG. 22 is a schematic diagram illustrating a transmission format for multiplexing video signals of four channels in SDTV format (480/60 I) and transmitting the resultant signals at a transmitting speed of the HDTV format in a transmitter and receiver of an SDI system of the present invention. FIG. 22(A) shows a video signal of one channel in the SDTV format fed into the transmitter. FIG. 22(B) illustrates that blanking periods and active video period of Y-signal and C-signal of this one channel are multiplexed with each other. In this sixth embodiment, these four signals are transmitted. The signals shown in FIG. 22(B) are further multiplexed by two channels and converted to as shown in FIG. 22(C), eventually the signals become four channels. This signal may be deemed to have 525 scanning lines, 2880 words in an active video period, then provides this signal with the processes similar to those in the first embodiment. However the active video period exceeds 1920 words, problems discussed in the background art section occur. In FIG. 1, parallel video data of four channels in the SDTV format is fed into SD/HD converting circuit 110 as a Y-signal in parallel-digital form and a multiplexed C-signal, each signal is in a 10-bit form as shown in FIG. 22(A). Converting circuit 110 converts the video signal into a transmission signal of the HDTV format, and a number of words per line exceeds 1920, and this may cause a pathological pattern. In order to prevent this problem, the following process is carried out. FIG. 23 shows an essential part of FIG. 4 in accordance with this sixth embodiment. In FIG. 23, common elements to those in FIG. 1 and FIG. 4 bear the same reference marks, and the descriptions thereof are thus omitted here. In FIG. 23, an output from the line memory (not shown) is not detailed, and the output of the line memory is shown in FIG. 22(C). Word-inserting-circuit 20 of a transmitting circuit comprises the following elements:

(a) k-word delaying circuit 21;
(b) level generating circuit 22; and
(c) switching circuit 23.

Switching control circuit 24 detects whether or not a number of words per line of the video data supplied from the line memory exceeds 1920, then controls switching circuit 23. Interface formatting circuit 120 works in the same manner as that shown in FIG. 4. Then an operation of word inserting circuit 20 is demonstrated hereinafter. Word inserting circuit 20 receives a parallel video signal having an active video period of 'm' from line memory 1 of SD/HD converting circuit 110 shown in FIG. 4. Then the parallel video data fed into circuit 20 is supplied to k-word delay circuit 21 and switching circuit 23.

Figure 24:
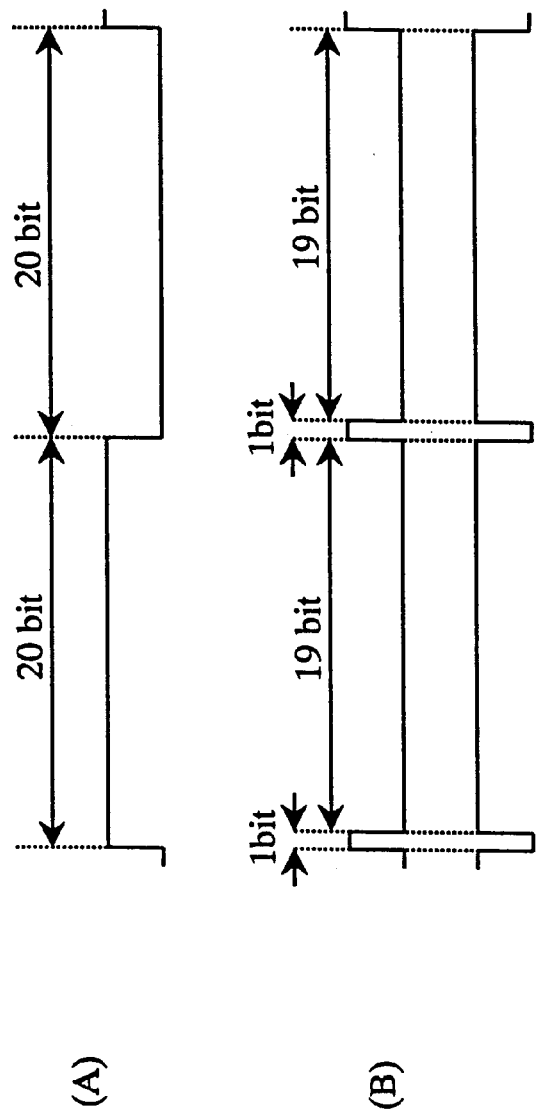
FIG. 24 shows waveforms illustrating a pattern of an identical code occurring in sequence of a serial signal.
Figure 25:
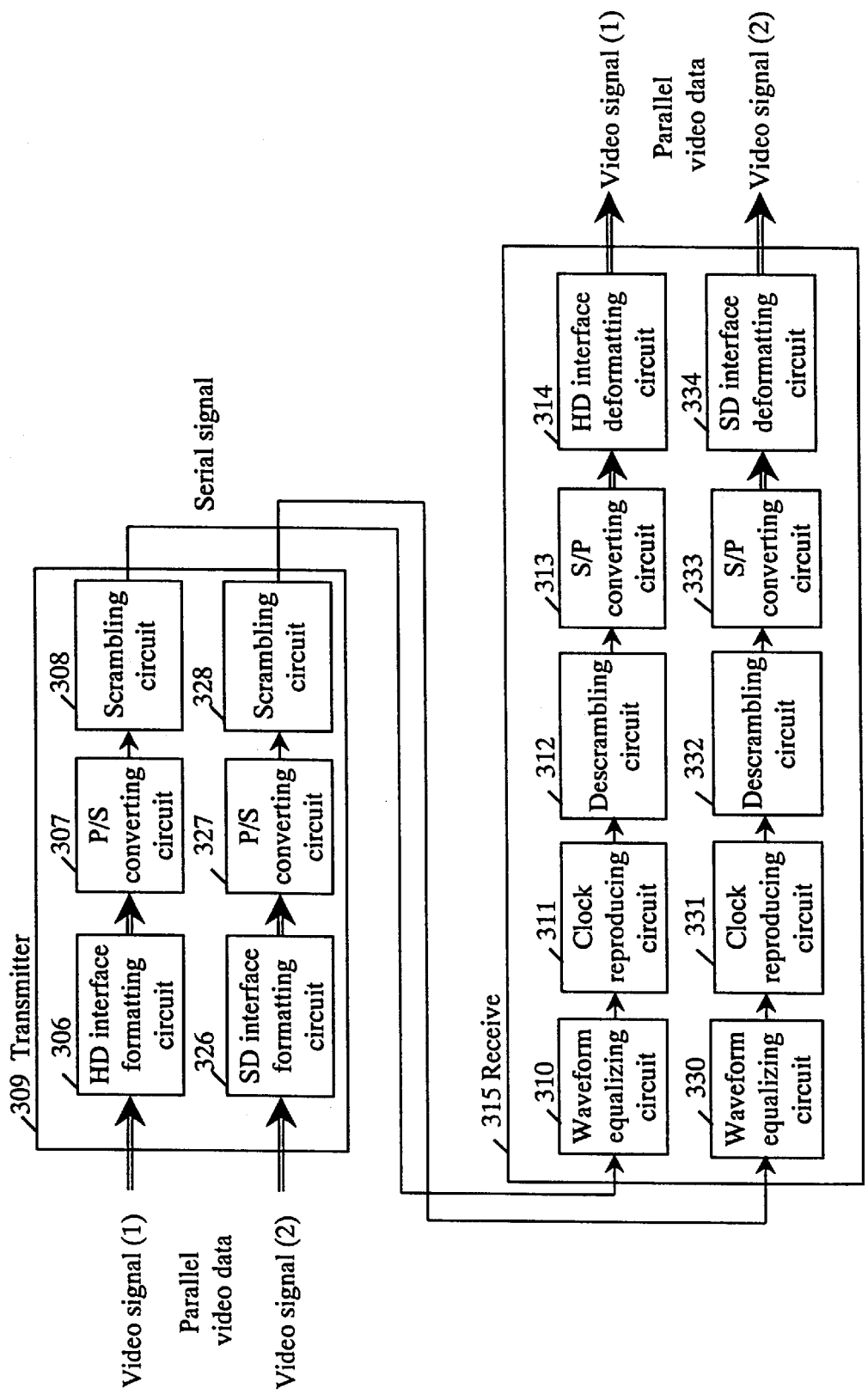
FIG. 25 is a block diagram illustrating a structure of a transmitter and a receiver of a conventional SDI system.

Level generating circuit 22 outputs a word level free from a pathological pattern. Tables 1 and 2 list word-levels that may produce a pathological pattern shown in FIG. 24 (A) and FIG. 24 (B) respectively.

TABLE 1

|  | First word | Second word |
|---|---|---|
| a1 | 200h | 110h |
| a2 | 100h | 088h |
| a3 | 080h | 044h |
| a4 | 040h | 022h |
| a5 | 020h | 011h |
| a6 | 210h | 008h |
| a7 | 108h | 004h |

TABLE 2

|  | First word | Second word |
|---|---|---|
| b1 | 200h | 331h |
| b2 | 300h | 198h |
| b3 | 180h | 0CCh |
| b4 | 0C0h | 066h |
| b5 | 060h | 033h |
| b6 | 230h | 019h |
| b7 | 318h | 00Ch |
| b8 | 18Ch | 006h |

As tables 1 and 2 show, when a value of two words (one word=10-bit, i.e. 1024 level) equals to a value listed in tables 1 and 2, an identical code may last the longest on a serial data. In the case of 'a1' on table 1, when a word of 200h level is fed into C-signal repeatedly and a word of 110h level is fed into Y-signal repeatedly, a signal of '20-bit=1' and a signal of '20-bit=0' may occur on a serial data. In the case of 'b2' on table 2, when a word of 200h level is fed into C-signal repeatedly and a word of 331h level is fed into Y-signal repeatedly, a signal of '1-bit=1' and a signal of '19-bit=0', or a signal of '1-bit=0' and a signal of '19-bit=1' may occur on a serial data. In other words, when C-signal and Y-signal encounter words other than the two-word combinations listed in tables 1 and 2, a continuation of an identical code is stopped on a serial signal. Tables 1 and 2 have, in total, 29 types of word levels that permit an identical code to be produced continuously. The values other than these 29 types thus stop the continuation of the identical code.

The SMPTE292M standard prohibits the active video period from generating eight levels (codes) in total, i.e. 000h, 001h, 002h, 003h, 3FCh, 3FDh, 3FEh, and 3FFh. Therefore, when any one of the word levels other than the 29 types of word levels and 8 types code prohibited is inserted into the active video period, the continuation of the identical code can be stopped on the serial data. Also, two or more words—except the 8 types of codes prohibited and other than the two-word combinations listed in tables 1 and 2—are inserted, the continuation of the identical code can be stopped on the serial data.

Level generating circuit 22 thus may as well generate and output the word levels other than the 29 types of word-levels and the 8 levels prohibited. For instance, circuit 22 may generate a word level of 040h that is a pedestal level of Y-signal. Switching circuit 23 receives a parallel video data having an active video period of 'm words', another parallel video data delayed by k-word by k-word delaying circuit 21 ('k' is an integer greater than zero '0') which have an active video period of 'm words', and an output from level generating circuit 22.

Switching control circuit 24 controls switching circuit 23 so that switching circuit 23 can output an active video period having 'n-word'('n' is not more than 1920 words), k-word of which level stops the continuation of the identical code and is supplied from level generating circuit 122, and another active video period having 'm−n' words (m−n is not more than 1920 words) in this order. This control permits an active video period greater than that of the HDTV format not to last. An identical code thus does not last longer than the serial signal in the HDTV format. As a result, a serial signal receiver for the HDTV can receive the video signal in the SDTV format.

An output from switching circuit 23, i.e. an output from word-inserting-circuit 20, is fed into interface-formatting-circuit 120, then EAV is added next to a final word of the active video period as well as SAV is added prior to the active video period, and line-number-data as well as error-detection-data is multiplexed to the period following the SMPTE292M standard. After this process, the active video period is output from circuit 120. An output from SD/HD converting circuit is fed into circuit 120, where Y-signal and C-signal are multiplexed with EAV and SAV respectively. EAV and SAV are horizontal and vertical reference timing signals respectively. The line-number-data and error-detection-code are also multiplexed to Y-signal and C-signal before these signals are output. An output from circuit 120 shown in FIG. 22(D) is fed into parallel-to-serial (P/S) converting circuit 130, where this output undergoes P/S conversion from the LSB of C-signal, C-signal and Y-signal in this order, then they are output from circuit 130. The output from circuit 130 is fed into scrambling circuit 140, where the signals are scrambled and converted into transmission signals in the HDTV format, then they are output as serial signals. In receiver 200, waveform equalizing circuit 210 receives the SDTV serial signals scrambled from transmitter 100. Circuit 210 corrects the signals degraded due to coaxial cable and equalizes the waveform, then outputs the signals to clock-reproducing-circuit 220, where a clock component is extracted to reproduce a clock, and serial data as well as serial clocks are output. Descrambling circuit 230 receives the serial data and serial clocks, and descrambles and then output them. S/P converting circuit 240 receives the serial data descrambled from circuit 230, then provides the data with S/P conversion, and output the resultant parallel data. Interface-deformatting-circuit 250 receives the parallel data from circuit 240, converts the data into video-parallel-data and outputs it to HD/SD converting circuit 260, which then detects automatically the presence of k-word. When the k-word is detected, circuit 260 deletes the k-word, and when not detected, leave as it is, and converts the data into SDTV video parallel data before outputting the data.

This sixth embodiment as discussed above proves the following fact: Plural channels in the SDTV format are multiplexed, and even if the resultant active video period exceeds 1920 words, which is a number of words of the active video period in the HDTV format, a pathological pattern can be prevented from occurring by inserting 'k-word' in the active video period. When the signal shown in FIG. 22(C) undergoes this process, the output from circuit 120 shown in FIG. 22(D) is obtained. This output signal is converted into serial data through P/S converting circuit 130 and scrambling circuit 140, they are the same circuits as those for transmitting serial signals in the HDTV format, and is output at the same serial transmitting speed. As for the receiver, the same circuit as that of the HDTV receiver can receive the serial signals. In this case, in the latter stage (deformatting circuit) of the receiver, a process reversal to that in word-inserting-circuit 20 is provided to convert the signals to the original ones.

This sixth embodiment demonstrates with a specific structure; however, the process discussed above can be programmed and realized by a computer.

In the above demonstration, an active video period having 'm' words is divided into two parts each having not more than 1920 words, and a word level—free from causing a continuous occurrence of a specific code on a serial signal—is inserted between the two parts. However, the active video period having 'm' words can be divided into more than two parts, and the word levels—free from causing a continuous occurrence of a specific code in respective parts—can be inserted between respective parts. This method also effects the same advantage.

In this sixth embodiment, parallel video data having a word length longer than that of the HDTV is serialized and then transmitted at the transmitting speed of the HDTV; however, it is not limited to the transmission at the HDTV speed, and other transmitting speeds can effect the same advantage. The data included in the active period of the parallel video data are not always the video data in the original SDTV active period.

In the embodiments previously discussed, 1.485/1.001 Gbps is used as the transmitting speed of the HDTV; however, 1.485 Gbps is also specified by the SMPTE292M standard, therefore, 1.485 Gbps can be handled in the same way as in the previous discussion. Regarding the SDTV video signal to be transmitted, known specifications such as 525 and 625 scanning lines, 30 Hz, 30/1.001 Hz, 25 Hz, 24 Hz, and 24/1.001 Hz. frame frequencies, can be handled. Further, optical fiber can be used as a transmitting line instead of the coaxial cable discussed in the embodiments.

Industrial Applicability

The SDTV signal having a rather slow transmitting speed is converted to a transmission signal of the HDTV format having a higher transmitting speed, so that a transmitter and receiver of the HDTV system can transmit the SDTV signal with a minimized delay. Thanks to the conversion, this transmission does not require major modification in the circuitry of the transmitter and receiver of the HDTV system. A receiver and a receiving method automatically detect the formats of the HDTV video signal and the SDTV video signal converted to a transmission signal having a speed close to that of the HDTV signal. Both the signals can be received by the same receiver through the receiving method. A video signal having more than 4096 words per scanning line can be multiplexed with an audio signal and then transmitted.

Plural channels of SDTV signals having a rather low transmitting speed are multiplexed and converted to transmission signals having the speed close to that of the HDTV signal, then transmitted, so that the transmitter and receiver of the HDTV system can transmit the SDTV signal with a minimized delay. This transmission requires no major modification in the circuitry of the HDTV transmitter.

When a signal, having a number of words in an active video period per line greater than that of the active video period of the HDTV signal, is transmitted at approx. 1.5 Gbps, i.e. the serial transmitting speed of the HDTV signal, an HDTV receiver can receive this signal without modifying itself. In this case, a transmitter and a transmitting method preventing a pathological pattern from occurring can be achievable without modification in a high speed operating section of an SDI system for the HDTV signals.

The present invention thus effects great advantages in the industry.

What is claimed is:

1. A method of transmitting one of a high-definition-television (HDTV) signal of one channel and a standard television (SDTV) signal of N channels (N is an integer more than zero) in a serial digital form, said method comprising:

dividing a total number of bits of a luminance signal of the HDTV signal to be transmitted within one frame of the HDTV signal into units corresponding to a total number of scanning lines K per frame of one channel of the SDTV signal, when the SDTV signal is transmitted;

producing two series of K pieces of transmission unit per frame, the transmission unit including a luminance signal and a color signal per frame;

inserting at least a given control signal words and words corresponding to a given level, a signal comprising samples having N times of a number of words of a luminance signal within a given period of one horizontal scanning period of the SDTV and including one of a color signal and a luminance signal of the SDTV signal into a transmission unit corresponding to an active scanning line of the SDTV; and serializing the signals of the two series into one system for transmitting.

2. The method as defined in claim 1, wherein a transmission speed is one of 1.485 Gbps and 1.485/1.001 Gbps.

3. The method as defined in claim 1, wherein the one frame period is one of 1/30 sec, 1/(30×1.001) sec, 1/24 sec, 1/(24×1.001) sec, 1/25 sec, 1/60 sec, and 1/(60×1.001) sec.

4. The method as defined in claim 1, wherein the given level is a blanking level.

5. The method as defined in claim 1, wherein the control signal is in accordance with SMPTE292M standard.

6. The method as defined in claim 5, wherein when a number of bits included in one transmission unit exceeds 4096, an audio clock phase information of an audio packet included in a given control signal is transmitted in 13 bits.

7. The method as defined in claim 1, wherein the SDTV is in '480/60 I' format and the one transmission unit includes one of 4714 bits and 4715 bits.

8. The method as defined in claim 1, wherein the SDTV is in '480/60 P' format and the one transmission unit includes one of 2357 bits and 2358 bits.

9. A method as defined in claim 1 comprising:

dividing a video signal into a plurality of sections each having not more than 1920 words when the video signal in the transmission unit has more than 1920 words;

inserting k-words (k is an integer more than 0) of a word level ranging from 005h (h: a hexadecimal digit) to 3FBh between sections divided, the word level preventing a pathological pattern from occurring; and converting the video signal into a serial signal.

10. The method as defined in claim 9, wherein the word level preventing the pathological pattern from occurring is 040h.

* * * * *